(12) United States Patent
Fukasawa et al.

(10) Patent No.: US 11,514,604 B2
(45) Date of Patent: Nov. 29, 2022

(54) INFORMATION PROCESSING DEVICE AND INFORMATION PROCESSING METHOD

(71) Applicant: SONY CORPORATION, Tokyo (JP)

(72) Inventors: Naofumi Fukasawa, Tokyo (JP);
Yasutaka Fukumoto, Tokyo (JP);
Yoshitaka Suga, Kanagawa (JP);
Takahiro Tsujii, Kanagawa (JP);
Noriyuki Suzuki, Chiba (JP); Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 229 days.

(21) Appl. No.: 16/769,937

(22) PCT Filed: Oct. 4, 2018

(86) PCT No.: PCT/JP2018/037138
§ 371 (c)(1),
(2) Date: Jun. 4, 2020

(87) PCT Pub. No.: WO2019/116689
PCT Pub. Date: Jun. 20, 2019

(65) Prior Publication Data
US 2020/0388052 A1     Dec. 10, 2020

(30) Foreign Application Priority Data
Dec. 15, 2017 (JP) .............................. JP2017-240650

(51) Int. Cl.
*G06T 7/73*     (2017.01)
*G06V 40/20*    (2022.01)
*G06V 40/10*    (2022.01)

(52) U.S. Cl.
CPC .............. *G06T 7/75* (2017.01); *G06V 40/103* (2022.01); *G06V 40/28* (2022.01)

(58) Field of Classification Search
CPC ... G06T 19/006; G06T 2200/24; G06T 17/00; G06T 7/73; G06T 7/75; G06T 7/80;
(Continued)

(56) References Cited

U.S. PATENT DOCUMENTS

2002/0037768 A1* 3/2002 Ohshima ................. G06F 3/017
463/31
2009/0128552 A1* 5/2009 Fujiki .................. G06T 19/006
345/419

(Continued)

FOREIGN PATENT DOCUMENTS

CN      102918489 A    2/2013
EP      1193651 A2     4/2002
(Continued)

OTHER PUBLICATIONS

Motor rehabilitation using virtual reality—2004 (Year: 2004).*
(Continued)

*Primary Examiner* — Nizar N Sivji
(74) *Attorney, Agent, or Firm* — Chip Law Group

(57) ABSTRACT

An information processing device, an information processing method, and a program are provided. The information processing device includes a virtual object control unit that generates a control parameter that controls display of a first virtual object corresponding to a first real object and a second virtual object corresponding to a second real object on the basis of first posture information indicating a posture of the first real object and second posture information indicating a posture of the second real object, and a determination unit that makes a determination related to contact between the first virtual object and the second virtual object. The virtual object control unit generates the control parameter on the further basis of a result of the determination.

16 Claims, 12 Drawing Sheets

(58) Field of Classification Search
CPC ........ G06T 19/00; G06V 40/20; G06V 40/23;
G06V 20/44; G06V 40/107; G06V 40/16;
G06V 20/48; G06V 30/1988; G06V
40/103; G06V 40/28; G06V 20/20; A63F
13/212; A63F 13/213; A63F 2300/1087;
A63F 2300/5553; A63F 13/428
See application file for complete search history.

(56) References Cited

U.S. PATENT DOCUMENTS

| | | | | |
|---|---|---|---|---|
| 2011/0298827 | A1* | 12/2011 | Perez | G06V 40/28 345/647 |
| 2014/0240552 | A1* | 8/2014 | Kasahara | H04N 5/33 348/239 |
| 2014/0292810 | A1* | 10/2014 | Tsurumi | G06T 11/00 345/633 |
| 2015/0109335 | A1* | 4/2015 | Hayakawa | G06K 9/6217 345/633 |
| 2015/0265922 | A1* | 9/2015 | Yamane | A63F 13/213 463/31 |
| 2021/0097776 | A1* | 4/2021 | Faulkner | G06F 3/0304 |

FOREIGN PATENT DOCUMENTS

| | | | |
|---|---|---|---|
| JP | H11353304 | A * | 6/1998 |
| JP | 11-353304 | A | 12/1999 |
| JP | 2000-194876 | A | 7/2000 |
| JP | 2001-236291 | A | 8/2001 |
| JP | 2001236291 | A * | 8/2001 |
| JP | 2002-112286 | A | 4/2002 |
| JP | 2002-149581 | A | 5/2002 |
| JP | 2002149581 | A * | 5/2002 |
| JP | 2011-118834 | A | 6/2011 |
| JP | 2013-533537 | A | 8/2013 |
| WO | 2011/153078 | A2 | 12/2011 |

OTHER PUBLICATIONS

Design and Implementation of A Virtual-Real Interaction System—2017 (Year: 2017).*
Dual Face Interaction in Handheld Augmented Reality Environments—2009 (Year: 2009).*
Virtual Scene Control Using Human Body Postures—2003 (Year: 2003).*
International Search Report and Written Opinion of PCT Application No. PCT/JP2018/037138, dated Dec. 25, 2018, 11 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/037138 filed on Oct. 4, 2018, which claims priority benefit of Japanese Patent Application No. JP 2017-240650 filed in the Japan Patent Office on Dec. 15, 2017. Each of the above-referenced applications is hereby incorporated herein by reference in its entirety.

TECHNICAL FIELD

The present disclosure relates to an information processing device, an information processing method, and a program.

BACKGROUND ART

In recent years, an imaginary virtual object has been displayed in a real space (actual space) or in a virtual space corresponding to the real space. In a case where displaying a virtual object in a real space or a virtual space corresponding to the real space, it is desirable to display the virtual object with less discomfort to the user. Therefore, for example, Patent Document 1 below discloses a technique for displaying virtual information having a size suitable for a scale in a real space.

CITATION LIST

Patent Document

Patent Document 1: Japanese Patent Application Laid-Open No. 2011-118834

SUMMARY OF THE INVENTION

Problems to be Solved by the Invention

However, discomfort given to the user cannot be sufficiently reduced in some cases by simply controlling the size of the virtual object. For example, in a case where two real objects or two virtual objects come into contact with each other, there is a possibility that the discomfort given to the user cannot be sufficiently reduced only by controlling the size of the virtual objects. Therefore, the present disclosure proposes an information processing device, an information processing method, and a program that can further reduce the sense of discomfort given to a user.

Solutions to Problems

According to the present disclosure, there provided is an information processing device including a virtual object control unit configured to generate a control parameter that controls display of a first virtual object corresponding to a first real object and a second virtual object corresponding to a second real object on the basis of first posture information indicating a posture of the first real object and second posture information indicating a posture of the second real object, and a determination unit configured to make a determination related to contact between the first virtual object and the second virtual object, in which the virtual object control unit generates the control parameter on the further basis of a result of the determination.

Furthermore, according to the present disclosure, there provided is an information processing method, including generating a control parameter that controls display of a first virtual object corresponding to a first real object and a second virtual object corresponding to a second real object on the basis of first posture information indicating a posture of the first real object and second posture information indicating a posture of the second real object, making a determination related to contact between the first virtual object and the second virtual object, and generating the control parameter on the further basis of a result of the determination.

Furthermore, according to the present disclosure, there provided is a program that causes a computer to realize functions including a function of generating a control parameter that controls display of a first virtual object corresponding to a first real object and a second virtual object corresponding to a second real object on the basis of first posture information indicating a posture of the first real object and second posture information indicating a posture of the second real object, making a determination related to contact between the first virtual object and the second virtual object, and a function for the control parameter on the further basis of a result of the determination.

Effects of the Invention

As described above, according to the present disclosure, it is possible to further reduce discomfort given to a user.

Here, the above described effect should not be limited, and there may be any one of the effects described in this specification or other effects that can be generated on the basis of the present specification in addition to the above described effects, together with the above mentioned effects, or as a substitute for the above mentioned effects.

MODE FOR CARRYING OUT THE INVENTION

Figure 1:
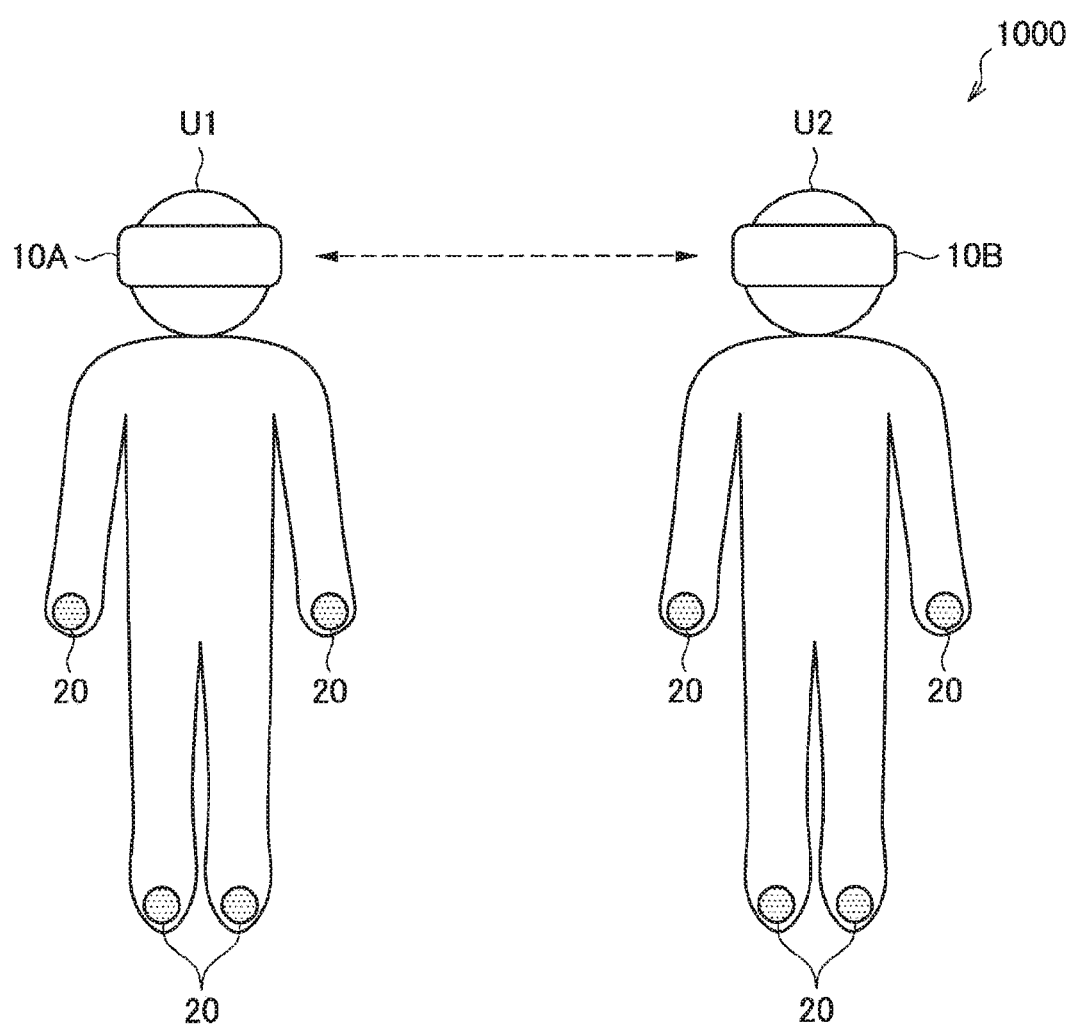
FIG. 1 is an explanatory diagram illustrating a schematic configuration of an information processing system 1000 according to an embodiment of the present disclosure.

Preferred embodiments of the present disclosure will be described in detail below with reference to the accompanying drawings. Here, in the present specification and the drawings, same reference numerals are given to constituent elements having substantially same functional configuration, and redundant explanation will be omitted.

Furthermore, in the present specification and drawings, a plurality of constituent elements having substantially the same functional configuration may be distinguished by adding different alphabets after the same reference numeral. However, in a case where it is not necessary to particularly distinguish each of a plurality of constituent elements having substantially the same functional configuration, only the same reference numerals are given.

Note that the description will be given in the following order.

<<1. Overview>>
<<2. Configuration>>
<<3. Operation>>
<<4. Modification>>
 <4-1. First Modification>
 <4-2. Second Modification>
 <4-3. Third Modification>
 <4-4. Fourth Modification>
 <4-5. Fifth Modification>
 <4-6. Sixth Modification>
<<5. Hardware configuration example>>
<<6. Conclusion>>

1. OVERVIEW

FIG. 1 is an explanatory diagram illustrating a schematic configuration of an information processing system 1000 according to an embodiment of the present disclosure. The information processing system 1000 according to the present embodiment is a system for providing a user with a virtual reality (VR) experience that is not real but has similar essence as a function.

As illustrated in FIG. 1, the information processing system 1000 includes information processing devices 10A and 10B and a plurality of sensor devices 20.

The information processing devices 10A and 10B may be devices worn by a user such as a head-mounted display (HMD) for example, and in the example illustrated in FIG. 1, the information processing device 10A and the information processing device 10B are worn by a user U1 and a user U2, respectively. The information processing device 10A and the information processing device 10B are wirelessly connected directly or via a network access point and the like, and can transmit and receive data. Note that, in the following, in a case where it is not necessary to particularly distinguish each of the information processing devices 10A and 10B, they may be collectively referred to as an information processing device 10.

Furthermore, each of the user U1 and the user U2 wears the plurality of sensor devices 20. Note that the wearing position of the sensor device 20 and the number of the sensor devices 20 worn by each user are not limited to the example illustrated in FIG. 1.

The sensor device 20 is a device having a function of acquiring various kinds of information on the user or the surrounding environment by sensing. The sensor device 20 may be, for example, an inertial measurement unit (IMU) and the like, and may include a gyro sensor for detecting angular velocity (rotational speed) and an acceleration sensor for detecting acceleration. Note that the sensor device 20 is not limited to such an example and may acquire various information by sensing.

Each of the sensor devices 20 is connected to the information processing device 10 wirelessly or by wire, and transmits information (hereinafter, also referred to as sensor information) such as angular velocity and acceleration acquired by sensing to the information processing device 10. For example, the sensor device 20 worn by the user U1 may transmit sensor information to the information processing device 10A worn by the user U1, and the sensor device 20 worn by the user U2 may transmit sensor information to the information processing device 10B worn by the user U2. However, without being limited to such an example, each sensor device 20 may transmit the sensor information to both the information processing device 10A and the information processing device 10B.

The information processing device 10 displays an imaginary virtual object. Furthermore, the information processing device 10 may display a virtual space and display a virtual object in the virtual space. The virtual space displayed by the information processing device 10 is desirably associated with the real space and, for example, according to the head position and head posture of each user, the viewpoint of the user in the virtual space is determined and a virtual object in the visual field according to the viewpoint may be displayed. The units of the position, size, and the like in the virtual space and the real space may be different, but may be managed in the same unit. For example, it may be designed so that 10 cm in the real space corresponds to 10 cm in the virtual space. In the following, an example will be described in which the position and size information can be managed in the same unit between the virtual space and the real space and, as long as information can be mutually converted, similar functions can be appropriately realized.

The information processing device 10 may display, for example, a virtual object corresponding to a real object existing in the real space. Furthermore, the virtual object displayed by the information processing device 10 may be displayed at a position and orientation corresponding to the position and orientation of the real object corresponding to the virtual object.

For example, the information processing device 10 may display a virtual object corresponding to each user (an example of a real object). For example, the information processing device 10A worn by the user U1 may display a virtual object corresponding to the user U1 and a virtual object corresponding to the user U2. Hereinafter, the virtual object corresponding to the user may be referred to as an avatar.

Figure 2:
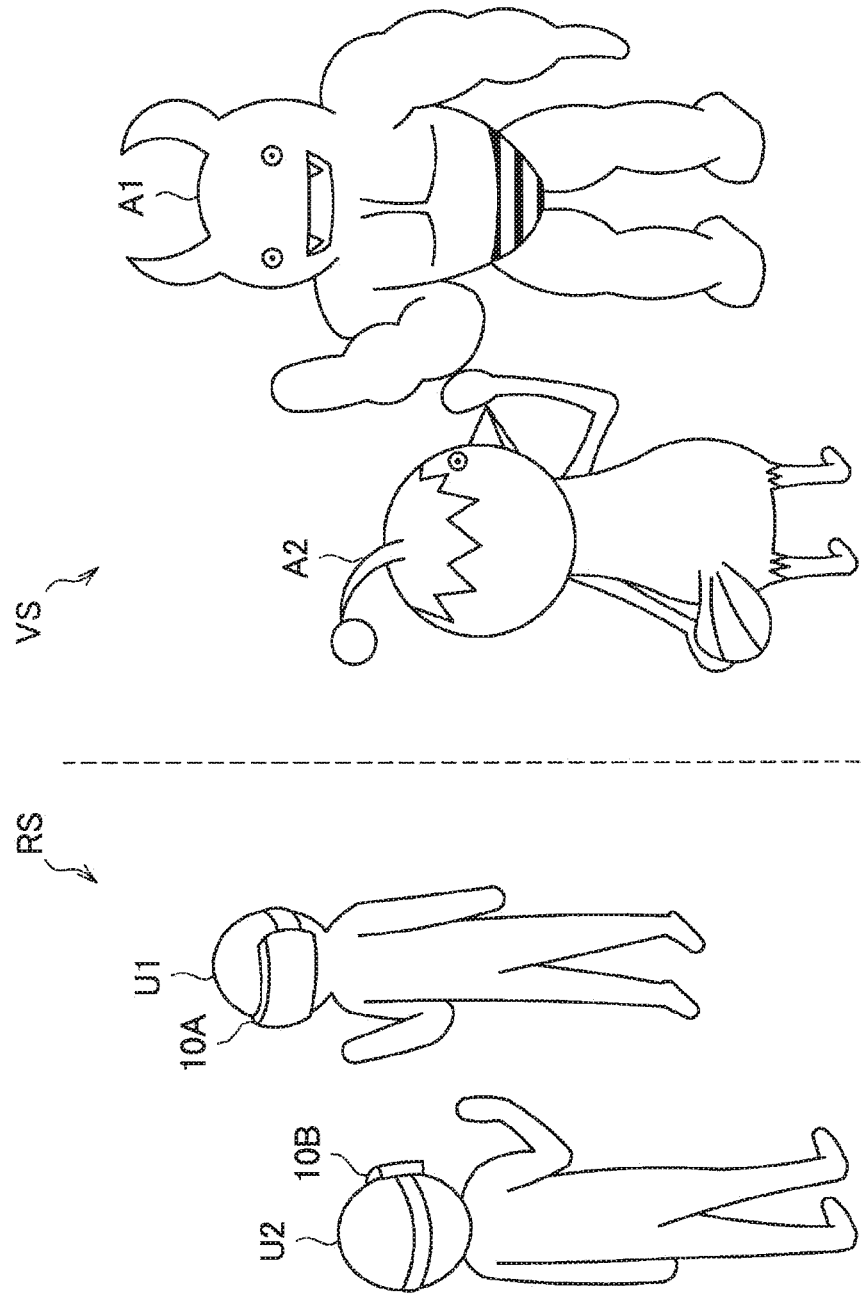
FIG. 2 is a schematic diagram for explaining an avatar.

FIG. 2 is a schematic diagram for explaining an avatar. FIG. 2 illustrates a real space RS and a virtual space VS which is corresponding to the real space RS. In the example illustrated in FIG. 2, an avatar A1 is a virtual object corresponding to the user U1, and an avatar A2 is a virtual object corresponding to the user U2. Note that, in FIG. 2, the real space RS and the virtual space VS are illustrated from a bird's-eye view for simplicity, but as described above, each of the information processing devices 10 displays the avatars from the viewpoint corresponding to the position and posture of the head of each user wearing each of the information processing devices 10. The information on the head position and head posture of each user may be specified on the basis of sensor information obtained by a sensor included in the information processing device 10, or may be specified on the basis of sensor information obtained by the sensor device 20 and transmitted to the information processing device 10.

As illustrated in FIG. 2, each avatar is desirably displayed in a posture according to the posture of the user corresponding to each avatar. With this configuration, the users can smoothly communicate with each other via the avatars in the virtual space.

In order for the information processing device 10 to control the posture of the avatar as described above, for example, a motion capture technology may be used. The motion capture technology is a technology for acquiring motion of a real object such as a person. For example, the information processing device 10 can obtain motion of each user by obtaining posture information indicating the posture of each user over time on the basis of sensor information such as angular velocity and acceleration received from the sensor device 20 described above and sensor information acquired by a sensor included in the information processing device 10.

Figure 3:
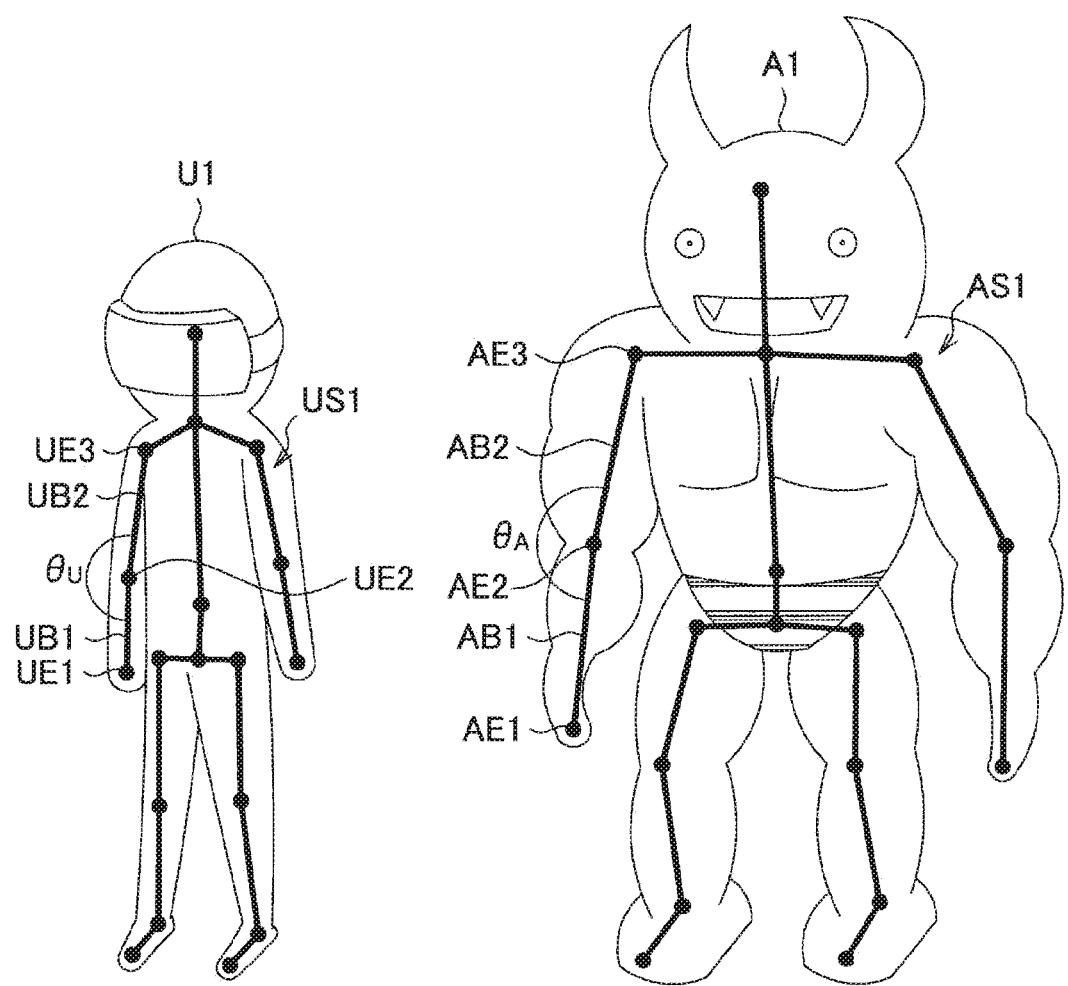
FIG. 3 is an explanatory diagram for describing avatar posture control using a motion capture technology.

Here, avatar posture control using the motion capture technology will be described with reference to FIG. 3. FIG. 3 is an explanatory diagram for explaining the avatar posture control using the motion capture technology.

As described above, the information processing device 10 acquires the user's posture information on the basis of the sensor information obtained by sensing. In the example illustrated in FIG. 3, skeleton information US1 indicating the posture of the user U1 is illustrated as the posture information of the user U1 acquired on the basis of the sensing of the user U1. The skeleton information US1 includes information on a plurality of line segments called bones. Each bone is information corresponding to, for example, a human bone, but does not always need to match an actual human skeleton. Each bone has two endpoints, and a plurality of bones may be connected by sharing one endpoint. Furthermore, an endpoint shared by a plurality of bones may be called a joint. The skeleton information US1 can include information such as the number and connection relationship of the bones, the position and orientation of each bone, or the angle between the bones.

Furthermore, skeleton information AS1 indicating the posture of the avatar A1 is also set in the avatar A1. The skeleton information AS1 may also include information such as the number and connection of bones, the number and connection of bones, the position and orientation of each bone, the angle between bones, and the angle between bones. The information processing device 10 may display the avatar A1 on the basis of the skeleton information AS1.

In order to display the avatar A1 in a posture corresponding to the posture of the user U1, for example, the skeleton information AS1 of the avatar A1 is only required to be generated according to the acquired skeleton information US1 of the user U1. Note that, here, the skeleton information US1 of the user U1 and the skeleton information AS1 of the avatar A1 may have the same number of bones or the same connection relationship, and each bone in the skeleton information US1 and each bone in the skeleton information AS1 may correspond on one-to-one basis. However, the lengths of the corresponding bones may differ between the skeleton information US1 and the skeleton information AS1.

Then, the skeleton information AS1 is generated so that the angles between the corresponding bones match with each other, which is the same angle for example, between the skeleton information US1 and the skeleton information AS1 so that the avatar A1 can be displayed in a posture corresponding to the posture of the user U1. Note that reflecting the angle of the bones included in the skeleton information acquired from the user to the angle of the bones in the skeleton information of the avatar in this manner is called retargeting.

The retargeting will be described using an example illustrated in FIG. 3. As illustrated in FIG. 3, in the skeleton information US1 of the user U1, the angle between the bone UB1 having the endpoint UE1 and the endpoint UE2 and the bone UB2 having the endpoint UE2 and the endpoint UE3 is indicated by an angle $\theta_U$. Furthermore, in the skeleton information AS1 of the avatar A1, the angle between the bone UB1 having the endpoint UE1 and the endpoint UE2 and the bone UB2 having the endpoint UE2 and the endpoint UE3 is indicated by an angle GA.

Furthermore, between the skeleton information US1 of the user U1 and the skeleton information AS1 of the avatar A1, the bone UB1 and the bone AB1 correspond, and the bone UB2 and the bone AB2 correspond. Therefore, according to the retargeting, the skeleton information AS1 is generated so that $\theta_A = \theta_U$. Note that, although only the angle between one set of corresponding bones has been described above, the skeleton information AS1 is generated by similarly determining the angles between all the corresponding bones.

Note that the generation of the skeleton information AS1 of the avatar A1 by the retargeting has been described above, and the skeleton information of the avatar A2 is generated on the basis of the skeleton information of the user U2 in a similar manner. In other words, skeleton information indicating the posture of the user U2 is used as the posture information of the user U2 acquired on the basis of the sensing of the user U2. Then, skeleton information of the avatar A2 can be generated by retargeting based on the skeleton information of the user U2.

The skeleton information AS1 of the avatar A1 and the skeleton information of the avatar A2 can be used as control parameters for displaying the avatars A1 and A2.

For example, an avatar A1 and an avatar A2 can be displayed by forming a mesh around each bone on the basis of each piece of skeleton information and drawing a texture on the mesh. Furthermore, the mesh may be displayed so as to be deformed according to each piece of skeleton information and, in such a case, by changing the angle between the bones, the mesh is deformed, and the posture of each avatar can be changed.

As described above, according to the information processing system 1000 according to the present embodiment, each avatar is displayed in a posture similar to the posture of the user corresponding to each avatar, and smooth communication can be realized in the virtual space. Furthermore, by applying the information processing system 1000 according to the present embodiment to a VR game and the like, a game with a more immersive feeling can be realized.

Here, as described above, even in a case where the posture of the avatar is displayed so as to be similar to the posture of the user corresponding to the avatar, the physique of the avatar may be different from the physique of the user. Note that the physique is not limited to the overall size, but refers to a concept including the length, thickness, and the like of each part.

Even in a case where the posture of the avatar is displayed so as to be completely the same as the posture of the user corresponding to the avatar, if the physique of the avatar and the physique of the user are different, divergence (physique difference) occurs between the real space and the virtual space. Such a divergence may cause discomfort to the user and, for example, in a case where the avatars contact each other or are likely to contact each other, this may cause discomfort to the user.

Figure 4:
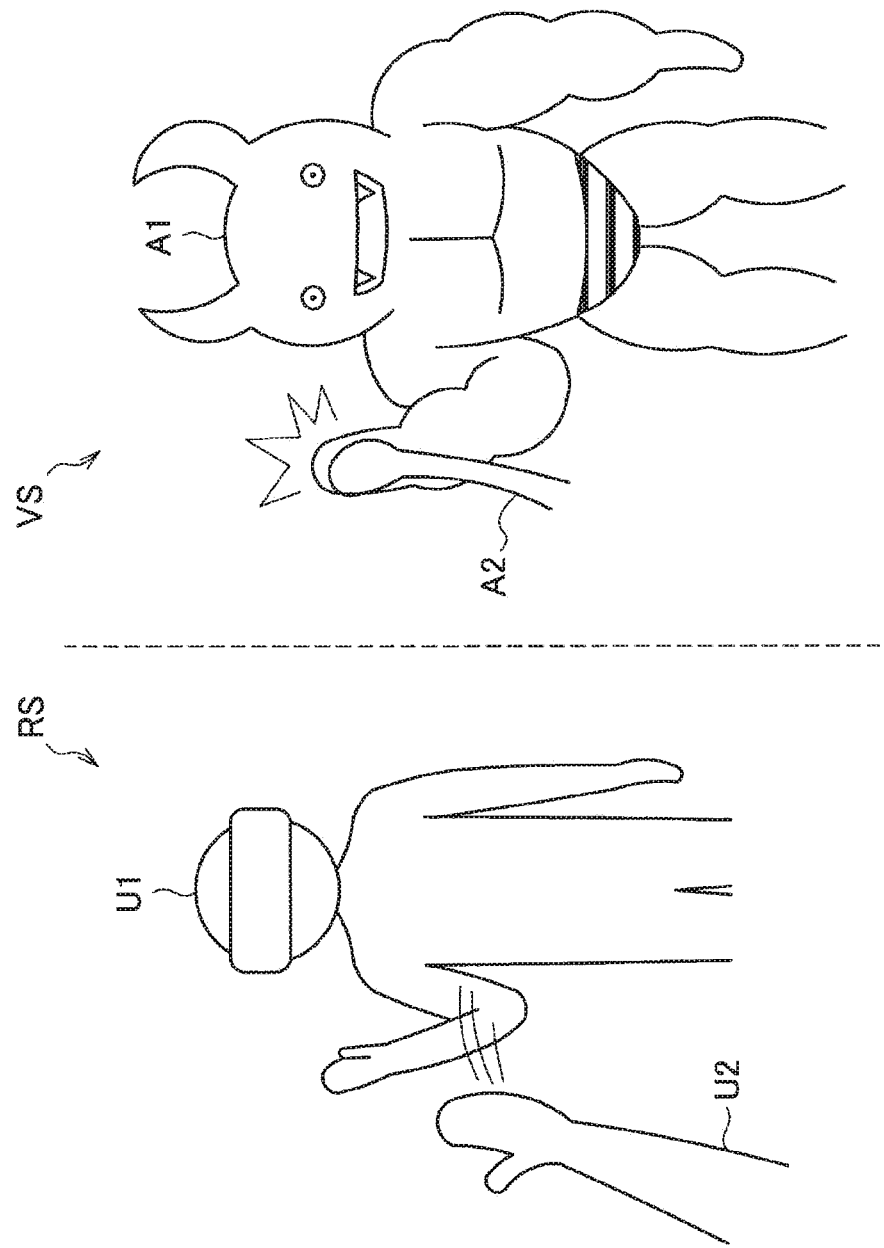
FIG. 4 is an explanatory diagram for explaining a feeling of discomfort of a user due to a physique difference between a user in a real space and an avatar in a virtual space.

FIG. 4 is an explanatory diagram for explaining a feeling of discomfort given to the user due to a physique difference between the user in the real space and the avatar in the virtual space. FIG. 4 illustrates the real space RS and the virtual space VS from the viewpoint of the user U2.

As described above, since the user U2 is wearing the information processing device 10B that is an HMD, the user U2 sees not the real space RS but the virtual space VS displayed on the information processing device 10B. Therefore, in a case where the user U2 tries to contact the avatar A1 corresponding to the user U1, the user U2 changes own posture of the user U2 to change the posture of the avatar A2 so that a hand and the like of the avatar A2 contact a hand and the like of the avatar A1, for example. However, as illustrated in FIG. 4, even in a case where the avatar A1 and the avatar A2 are in contact in the virtual space VS, the user U1 and the user U2 are not in contact in the real space RS in some cases due to the physique difference between each user and each avatar corresponding to each user. In this case, the information of the virtual space VS that the user U2 sees does not match the physical sensation in the real space RS, and the user U2 may feel discomfort.

Furthermore, FIG. 4 illustrates an example in which the user cannot make contact in the real space against the user's intention to make contact; however, an opposite case may be considered. For example, even in a case where the user does not intend to contact another user's avatar, and the avatar corresponding to the user himself and the avatar corresponding to the other user is not contacting each other in the virtual space, the users may come into contact with each other in the real space.

As described above, depending on the physique difference between the user and the avatar, there are cases where the intended contact cannot be made in the real space or an unintended contact occurs in the real space. For example, by making the physique of the avatar the same as the physique of the user corresponding to the avatar, contact or non-contact as intended by the user may be realized. However, depending on the application (a VR game and the like), it is often important to make the user recognize an avatar is a virtual entity (avatar) which is different from a real person, by displaying the avatar with a physique different from the physique of the user corresponding to the avatar, for example. In a case where the physique of each avatar is displayed so as to be the same as the physique of the user corresponding to each avatar, the difference between the real user and the avatar is reduced, and such recognition may be weakened. Therefore, in such an application, it is not desirable that the physique of the avatar be the same as the physique of the user corresponding to the avatar.

Thus, in view of the above circumstances, an embodiment of the present disclosure has been created. According to the present embodiment, discomfort given to the user can be reduced by determining whether or not contact between avatars is expected and correcting skeleton information of the avatar in a case where it is determined that the contact between avatars is expected. Hereinafter, the configuration and operation of the information processing device 10 according to an embodiment of the present disclosure having such effects will be sequentially described.

2. CONFIGURATION

The outline of the present embodiment has been described above. Next, a configuration example of the information processing device 10 according to the present embodiment will be described with reference to FIG. 5. Note that, as illustrated in FIG. 1, the information processing device 10 is worn by a user. Furthermore, as illustrated in FIG. 1, the information processing system 1000 according to the present embodiment may include a plurality of information processing devices 10 which are worn by different users respectively. Therefore, in the following description, in order to distinguish each of the users and each of the information processing devices 10, the following classification is appropriately performed as necessary. A user wearing the information processing device 10 to be described is called a self-user (a first real object), a user different from the self-user is called a partner user (a second real object), and the information processing device 10 worn by the partner user may be called an other information processing device 10. Furthermore, the avatar corresponding to the self-user may be referred to as a self-avatar (a first virtual object), and an avatar corresponding to the partner user may be referred to as a partner avatar (a second virtual object).

Figure 5:
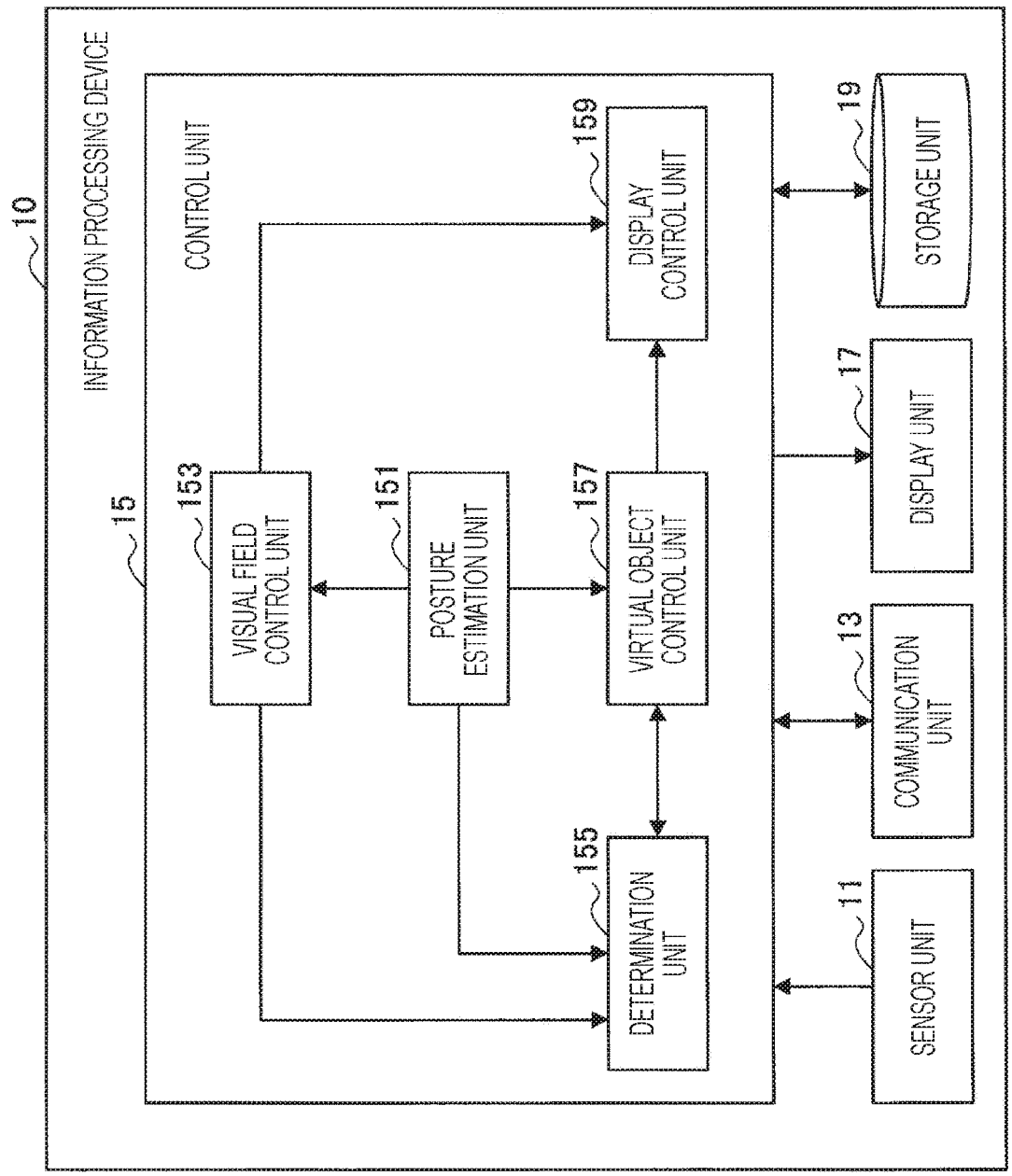
FIG. 5 is a block diagram illustrating a configuration example of an information processing device 10 according to an embodiment.

FIG. 5 is a block diagram illustrating an example of a configuration of the information processing device 10 according to the present embodiment. As illustrated in FIG. 5, an information processing device 10 according to the present embodiment is an information processing device including a sensor unit 11, a communication unit 13, a control unit 15, a display unit 17, and a storage unit 19.

The sensor unit 11 has a function of acquiring various kinds of information about the self-user or surrounding environment by sensing. For example, the sensor unit 11 may include a gyro sensor that detects an angular velocity and an acceleration sensor that detects an acceleration in order to sense the head movement of the self-user. However, in a case where the sensor device 20 is worn on the head, the sensor unit 11 may not include a gyro sensor or an acceleration sensor.

Furthermore, the sensor unit 11 included in the information processing device 10 may include various sensors such as a direction sensor, a position sensor, a biological sensor, a camera, and a microphone, and may include more than one of those sensors. Information (sensor information) acquired by sensing of the sensor unit 11 is provided to the control unit 15.

The communication unit 13 is a communication module for transmitting and receiving data to and from another device by wire or wirelessly. The communication unit 13 performs wireless communication with an external device directly or through a network access point by, for example, a wired local area network (LAN), a wireless LAN, wireless fidelity (Wi-Fi, registered trademark), infrared communication, Bluetooth (registered trademark), short-range/contactless communication, and the like.

For example, the communication unit 13 is connected to a plurality of sensor devices 20 worn by the self-user and receives sensor information. Furthermore, as illustrated in FIG. 1, the communication unit 13 is connected to an other information processing device 10 worn by a partner user. Then, the communication unit 13 transmits later described posture information of the self-user (first posture information) estimated by the control unit 15 to the other information processing device 10, and receives posture information of the partner user (second posture information) from the other information processing device 10.

The control unit 15 functions as an arithmetic processing device and a control device, and controls overall operations in the information processing device 10 according to various programs. In addition, the control unit 15 according to the present embodiment functions as a posture estimation unit 151, a visual field control unit 153, a determination unit 155, a virtual object control unit 157, and a display control unit 159, as illustrated in FIG. 5.

On the basis of the sensor information provided from the sensor unit 11 and the sensor information received by the communication unit 13 from the sensor device 20, the posture estimation unit 151 estimates posture information indicating the posture of the self-user wearing the information processing device 10 (also referred to as the first posture information or the posture information of the self-user).

The posture information of the self-user estimated by the posture estimation unit 151 is provided to the visual field control unit 153, the determination unit 155, and the virtual object control unit 157, and also transmitted to the other information processing device 10 worn by the partner user via the communication unit 13. The transmission of the posture information may be performed every time the posture information is estimated and, in the following, an example in which the plurality of information processing devices 10 always shares the latest posture information of each user will be described.

Note that the self-user's posture information estimated by the posture estimation unit 151 includes, for example, self-user's skeleton information (first real skeleton information) described with reference to FIG. 3. Furthermore, in a similar manner, the posture information of the partner user (second posture information) received by the communication unit 13 includes the skeleton information of the partner user (second real skeleton information).

The visual field control unit 153 determines a viewpoint in the virtual space on the basis of the self-user's posture information estimated by the posture estimation unit 151, and determines a visual field in the virtual space on the basis of the viewpoint. For example, the visual field control unit 153 may determine the viewpoint in the virtual space on the basis of the information on the position and posture of an endpoint corresponding to the self-user's head in the skeleton information of the self-user included in the posture information of the self-user.

The visual field control unit 153 provides information on the determined visual field to the determination unit 155 and the display control unit 159. Note that the information on the visual field is information regarding a later described range displayed by the display unit 17 in the virtual space, and is understood to be information regarding the display range of the display unit 17.

The determination unit 155 makes a determination related to contact between the self-avatar corresponding to the self-user and the partner avatar corresponding to the partner user. For example, the determination unit 155 may determine whether or not contact between the self-avatar and the partner avatar is expected. Note that the determination related to contact made by the determination unit 155 is not limited to this example and, for example, the determination unit 155 may determine whether or not the self-avatar is in contact with the partner avatar.

Furthermore, the determination unit 155 may make a determination related to the contact on the basis of the skeleton information of the self-user, the skeleton information of the partner user, and a later described control parameter generated by the virtual object control unit 157. Note that the later described control parameter generated by the virtual object control unit 157 includes the skeleton information of the self-avatar (first virtual skeleton information) and the skeleton information of the partner avatar (second virtual skeleton information).

Figure 6:
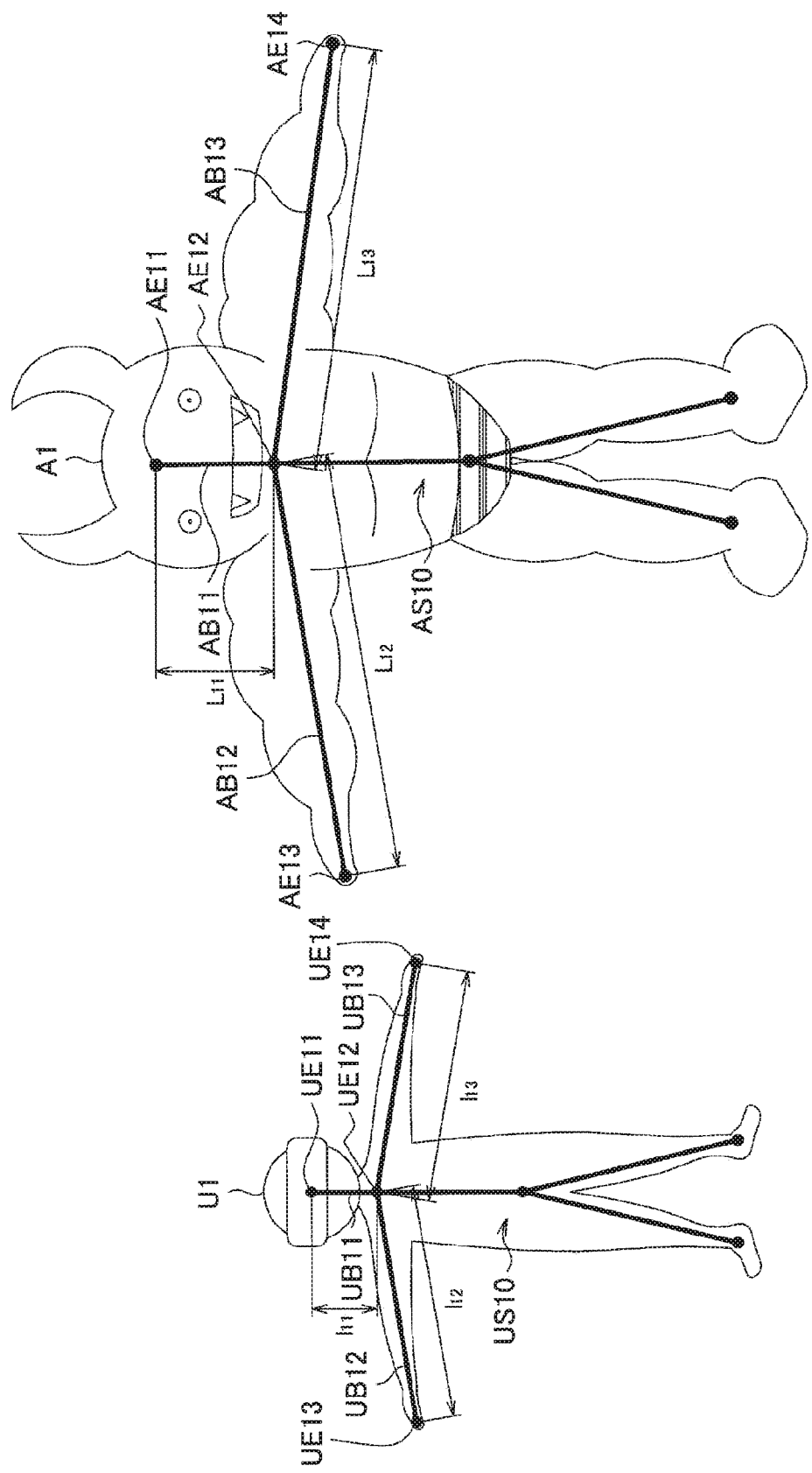
FIG. 6 is an explanatory diagram for explaining an example of a determination by a determination unit 155.

Hereinafter, an example of the determination by the determination unit 155 will be described with reference to FIG. 6. FIG. 6 is an explanatory diagram for explaining an example of the determination by the determination unit 155. FIG. 6 illustrates skeleton information US10 of the user U1 and skeleton information AS11 of the avatar A1 corresponding to the user U1. Note that the skeleton information of FIG. 6 is illustrated in a simple manner having a smaller number of bones compared to the skeleton information illustrated in FIG. 3, for simplicity of description. However, the example of FIG. 6 does not set any limitation, and even in a case where more complex (for example, including a large number of bones) skeleton information is used, the determination by the determination unit 155 can be performed in the similar manner as the determination described below.

First, with reference to FIG. 6, information used for determination by the determination unit 155 will be described. In each of the skeleton information US10 and the skeleton information AS10, one corresponding part is set in advance as a root part. For example, the root part may be set as a reference part indicating the position of each user and each avatar, for example. Note that, in this specification, the term "part" refers to a point on one of the bones included in each piece of skeleton information, and may or may not be an endpoint.

Hereinafter, an example will be described in which an endpoint UE11 and an endpoint AE11 of the head illustrated in FIG. 6 are set as the root part of the user U1 and the root part of the avatar A1, respectively.

The determination unit 155 may make determination using a reachable distance of a contact part with respect to the root part of the user (also referred to as user reachable distance) and a reachable distance of a contact part with respect to the root part of the avatar (also referred to as avatar reachable distance). The contact part is, for example, a portion that may contact, and may be set in advance. Furthermore, the user's contact part and the avatar's contact part may be set to be corresponding parts (for example, corresponding points of corresponding bones).

In addition, the reachable distance of the contact part with respect to the root part represents a distance that can be reached in a case where all the bones existing from the root part to the contact part are aligned in a straight line and may be calculated as a distance along the bone from the root part to the part, for example. Hereinafter, in the example illustrated in FIG. 6, the user reachable distance in a case where an endpoint UE13 corresponding to the right hand and an endpoint UE14 corresponding to the left hand are set as the contact parts of the user U1 will be described.

In a case where the endpoint UE13 is set as the contact part of the user U1, the user reachable distance is a sum of a length $l_{11}$ of the bone UB11 having the endpoint UE11 and the endpoint UE12 and the length $l_{12}$ of the bone UB12 having the endpoint UE12 and the endpoint UE13. Furthermore, in a case where the endpoint UE13 is set as the contact part of the user U1, the user reachable distance is a sum of the length $l_{11}$ of the bone UB11 having the endpoint UE11 and the endpoint UE12 and the length $l_{13}$ of the bone UB13 having the endpoint UE12 and the endpoint UE14.

Subsequently, in a similar manner, in the example illustrated in FIG. 6, the avatar reachable distance in a case where the endpoint AE13 corresponding to the right hand and the endpoint AE14 corresponding to the left hand are set as the contact parts of the avatar A1 will be described.

In a case where the endpoint AE13 is set as a contact part of the avatar A1, the avatar reachable distance is a sum of a length $L_{11}$ of the bone AB11 having the endpoint AE11 and the endpoint AE12 and a length $L_{12}$ of the bone AB12 having the endpoint AE12 and the endpoint AE13. Furthermore, in a case where the endpoint AE14 is set as the contact part of the avatar A1, the avatar reachable distance is a sum of the length $L_{11}$ of the bone AB11 having the endpoint AE11 and the endpoint AE12 and a length $L_{13}$ of the bone AB13 having the endpoint AE12 and the endpoint AE14.

In this manner, the user reachable distance and the avatar reachable distance are calculated. Note that, in a case where a plurality of contact parts of the user is set, a same number of user reachable distances corresponding to the number of contact parts may be calculated. Furthermore, in a similar manner, in a case where a plurality of avatar contact parts is set, a same number of avatar reachable distances corresponding to the number of contact parts may be calculated. Furthermore, the user reachable distance and the avatar reachable distance are calculated for every user and every avatar. In addition, the user reachable distance and the avatar reachable distance can be calculated regardless of the posture of the user and the avatar, and thus may be calculated in advance.

Note that, in the following, for the sake of simplicity, a case will be explained, as an example, in which one contact part is set for each of the self-user and the partner user, and similarly, one contact part is set for each of the self-avatar and the partner avatar. For example, an endpoint corresponding to the right hand of the self-user, an endpoint corresponding to the left hand of the partner user, an endpoint corresponding to the left hand of the self-avatar, and an endpoint corresponding to the left hand of the partner avatar may be set as the contact parts, respectively.

In a case where the contact part is set as described above, a user reachable distance of the self-user, a user reachable distance of the partner user, an avatar reachable distance of the self-avatar, and an avatar reachable distance of the partner avatar are calculated, individually. In the following description, the calculated user reachable distance of the self-user is $l_1$, the user reachable distance of the partner user is $l_2$, the avatar reachable distance of the self-avatar is $L_1$, and the avatar reachable distance of the partner avatar is $L_2$.

Furthermore, the determination unit 155 may use the distance between the root part of the self-user and the root part of the partner user (hereinafter, may be referred to as a distance between the users), and the distance between the root part of the self-avatar and the root part of the partner avatar (hereinafter, may be referred to as a distance between the avatars) to make a determination. The distance between the users may be calculated by the determination unit 155 each time the skeleton information of each user is estimated by the posture estimation unit 151, for example. Furthermore, in a similar manner, the distance between the avatars may be calculated by the determination unit 155 each time a control parameter including skeleton information of each avatar is generated by the virtual object control unit 157 described later. In the following description, the calculated distance between users is $D_U$, and the distance between avatars is $D_A$.

For example, in a case where the following (condition 1) or (condition 2) is satisfied, the determination unit 155 may determine that contact between the self-avatar and the partner avatar is expected.

$l_1+l_2<D_U$ (Condition 1):

$L_1+L_2<D_A$ (Condition 2):

The above (condition 1) is a condition that the sum of the reachable distance of the self-user and the reachable distance of the partner user is smaller than the distance between the users and, in a case where (condition 1) is satisfied, the self-user and the partner user can come into contact depending on the postures of the self-user and the partner user. The above (condition 2) is a condition that the sum of the reachable distance $L_1$ of the self-avatar and the reachable distance of the partner avatar is smaller than the distance between the avatars and, in case where (condition 2) is satisfied, the self-avatar and the partner avatar can come into contact depending on the postures of the self-avatar and the partner avatar.

Note that the determination unit 155 may further perform the determination on the basis of the information on the visual field of the self-user determined by the visual field control unit 153. For example, in a case where (condition 1) or (condition 2) is satisfied and the following (condition 3) is satisfied, the determination unit 155 may determine that contact between the self-avatar and the partner avatar within the visual field of the self-user is expected.

(Condition 3): The contact part of the self-avatar and the contact part of the partner avatar are within the visual field of the self-user.

Note that, in a case where the above (condition 3) is not satisfied, even if the contact part of the self-avatar and the contact part of the partner avatar come into contact, such contact occurs outside the visual field of the self-user. In such a case, the discomfort given to the user is considered to be small without performing later described correction of the skeleton information of the avatar. Therefore, the determination unit 155 may perform the determination on the basis of the information on the visual field of the self-user as in the above (condition 3). With such a configuration, in a case where a contact occurs outside the visual field of the self-user, the processing related to the correction of the skeleton information of the avatar is skipped as described later and the processing amount can be suppressed.

The example of the determination by the determination unit 155 has been described above. The determination unit 155 provides the information of the result of the determination as described above to the virtual object control unit 157.

The virtual object control unit 157 generates a control parameter for controlling the display of the self-avatar and the partner avatar. The control parameters generated by the virtual object control unit 157 include, for example, the skeleton information of the self-avatar (first virtual skeleton information) and the skeleton information of the partner avatar (second virtual skeleton information) described above. However, the control parameters generated by the virtual object control unit 157 are not limited to such examples, and other examples of the parameters will be described later as modified examples.

As described with reference to FIG. 3, the virtual object control unit 157 may generate the skeleton information of the self-avatar and the skeleton information of the partner avatar by retargeting based on the skeleton information of the self-user and the skeleton information of the partner user to generate the control parameters.

Furthermore, the virtual object control unit 157 may further generate a control parameter on the basis of the result of the determination by the above-described determination unit 155. For example, the virtual object control unit 157 may correct at least one of the skeleton information of the self-avatar or the skeleton information of the partner avatar in a case where it is determined that contact between the self-avatar and the partner avatar is expected, and generate the control parameters. With this configuration, in a case where contact between the self-avatar and the partner avatar is expected, the skeleton information of the avatars can be corrected so as to further reduce the sense of discomfort given to the self-user.

Note that, in a case where the skeleton information of the self-avatar is corrected, a mismatch may occur between the physical sensation of the self-user and the display of the self-avatar, and the user may feel discomfort. Therefore, an example in which the virtual object control unit 157 corrects the skeleton information of the partner avatar without correcting the skeleton information of the self-avatar will be described below. However, the present technology is not limited to such an example, and an example in which the virtual object control unit 157 corrects the skeleton information of the self-avatar will be described later as a modified example.

Figure 7:
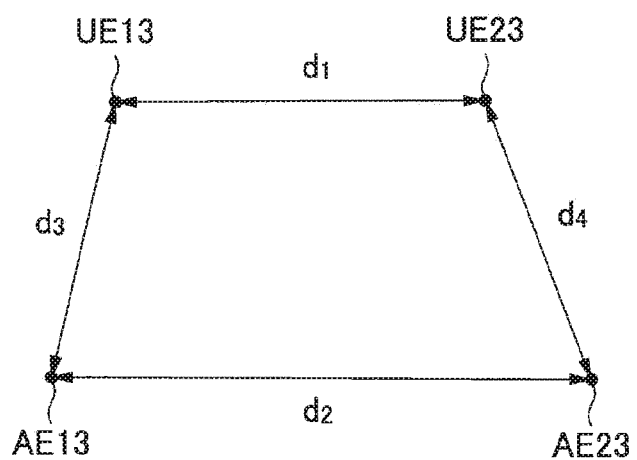
FIG. 7 is an explanatory diagram for explaining an example of the determination by the determination unit 155.
Figure 8:
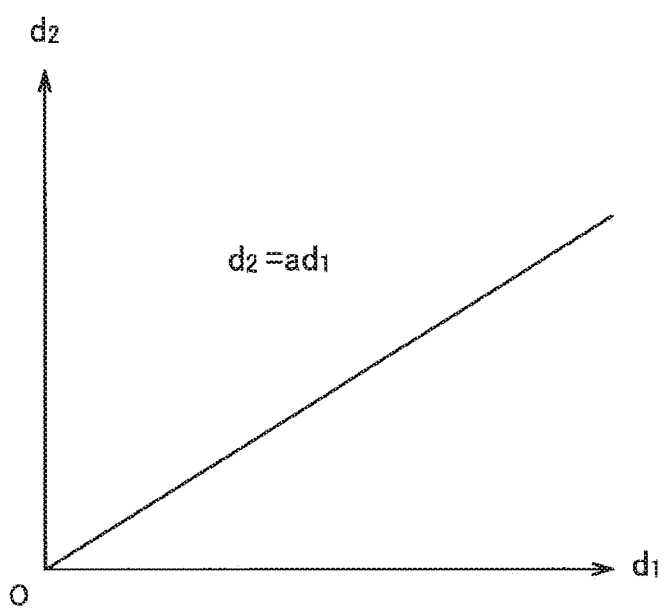
FIG. 8 is an explanatory diagram for explaining correction of skeleton information of a partner avatar by a virtual object control unit 157.

Hereinafter, the correction of the skeleton information of the partner avatar by the virtual object control unit 157 will be described with reference to FIGS. 7 and 8. FIGS. 7 and 8 are explanatory diagrams for describing correction of the skeleton information of the partner avatar by the virtual object control unit 157.

FIG. 7 illustrates a contact part UE13 of the self-user, a contact part UE23 of the partner user, a contact part AE13 of the self-avatar, and a contact part AE23 of the partner avatar, individually. Furthermore, FIG. 7 illustrates a distance $d_1$ between the contact part UE13 of the self-user and the contact part UE23 of the partner user (hereinafter, also referred to as a first distance or a distance between the user contact parts) and a distance $d_2$ between a contact part AE13 of the self-avatar and a contact part AE23 of the partner avatar (hereinafter, also referred to as a second distance or a distance between avatar contact parts).

Moreover, FIG. 7 also illustrates a distance $d_3$ between the contact part UE13 of the self-user and the contact part AE23 of the self-avatar (hereinafter, also referred to as a third distance), and a distance $d_4$ between the contact part UE23 of the partner user and the contact part AE23 of the partner avatar (hereinafter, also referred to as a fourth distance). Note that the contact part UE13 of the self-user and the contact part UE23 of the partner user illustrated in FIG. 7 exist in the real space, and the contact part AE13 of the self-avatar and the contact part AE23 of the partner avatar exist in the virtual space. However, as described above, between the virtual space and the real space, the information on the position and the size is associated so as to be manageable in the same unit, and therefore, as illustrated in FIG. 7, a distance between the contact parts existing in different spaces can be defined.

Here, the first distance $d_1$ is a distance specified on the basis of the skeleton information of the self-user and the skeleton information of the partner user, and is a distance determined according to the self-user and the partner user in the real space. Furthermore, in a case where the skeleton information of the self-avatar is corrected as described above, a mismatch may occur between the physical sensation of the self-user and the display of the self-avatar, and the user may feel discomfort. Therefore, it is desirable that the positional relationship between the contact part UE13 of the self-user and the contact part AE13 of the self-avatar is not changed, and third distance $d_3$ is fixed according to the present embodiment.

On the other hand, the second distance $d_2$ is a distance between the self-avatar and the partner avatar, and by appropriately controlling the second distance $d_2$, the control parameters can be generated so that the contact between the self-avatar and the partner avatar causes the contact between the self-user and the partner user almost simultaneously.

In a case where contact between the self-avatar and the partner avatar is expected, the virtual object control unit 157 may set a suitable second distance $d_2$ on the basis of the first distance $d_1$. For example, the virtual object control unit 157 may set the second distance $d_2$ such that the second distance $d_2$ becomes zero in a case where the first distance $d_1$ becomes zero. According to such a configuration, the contact between the self-avatar and the partner avatar occurs substantially at the same time as the contact between the self-user and the partner user, so that a sense of discomfort given to the user is reduced.

FIG. 8 illustrates an example of the relationship between the first distance $d_1$ and the second distance $d_2$ where the second distance $d_2$ becomes zero in a case where the first distance $d_1$ becomes zero. Note that "a" in FIG. 8 represents a predetermined positive real number. As illustrated in FIG. 8, the virtual object control unit 157 may set the second distance $d_2$ such that the second distance $d_2$ approaches zero as the first distance $d_1$ approaches zero. According to the configuration, according to the configuration, since the contact part of the self-user and the contact part of the partner user becomes close to each other as the contact part of the self-avatar and the contact part of the partner avatar becomes closer, the discomfort given to the user is reduced.

Note that the method of setting the second distance $d_2$ based on the first distance $d_1$ by the virtual object control unit 157 is not limited to the example illustrated in FIG. 8. Various relationships between the first distance $d_1$ and the second distance $d_2$ may be adopted so that the second distance $d_2$ is set so that the second distance $d_2$ becomes zero in a case where the first distance $d_1$ becomes zero, and the second distance $d_2$ becomes closer to zero as the first distance $d_1$ becomes closer to zero. For example, in the example illustrated in FIG. 8, the second distance $d_2$ is represented by a linear function using the first distance $d_1$ as a variable, but the second distance $d_2$ may be set so that the second distance $d_2$ is expressed by a nonlinear function using the first distance $d_1$ as a variable.

For example, the second distance $d_2$ may be set according to the operation of the self-user and the partner user. For example, in a case where a high-five operation is recognized, the second distance $d_2$ may be set such that the partner avatar moves at a timing immediately before contact or the moving speed of the partner avatar increases. Furthermore, the second distance $d_2$ may be set such that a hysteresis behavior occurs in cases where the contact part of the self-user and the contact part of the partner user approach and separate from each other. In this manner, the relationship between the first distance $d_1$ and the second distance $d_2$ can be appropriately designed so that the discomfort given to the user is further reduced.

The virtual object control unit 157 sets the second distance $d_2$ as described above, and moves the position of the contact part A23 of the partner avatar on the basis of the second distance $d_2$. Then, the virtual object control unit 157 corrects the skeleton information of the partner avatar on the basis of the position of the contact part A23 after the movement, and generates a control parameter. For example, the virtual object control unit 157 may correct the skeleton information of the partner avatar so as to satisfy a constraint condition including information on the position of the contact part of the partner avatar after the movement.

Note that, as described above, in a case where the second distance $d_2$ is changed by being set, the third distance $d_3$ may be fixed as described above, but the fourth distance $d_4$ may change together with the second distance $d_2$. The virtual object control unit 157 can specify the position of the contact part A23 of the partner avatar at the movement destination on the basis of the set second distance $d_2$ and fourth distance $d_4$.

For example, the virtual object control unit 157 may set the fourth distance $d_4$ so that the posture of the partner avatar does not become unnatural. For example, in a case where the contact part of the partner avatar is the tip of the hand, the virtual object control unit 157 sets the fourth distance $d_4$ such that the correction of the skeleton information of the partner avatar can be performed by moving only the upper arm and the lower arm. In addition, the virtual object control unit 157 may set the fourth distance $d_4$ such that the correction of the skeleton information of the partner avatar is performed to move the position of the center of gravity of the whole body.

The correction of the skeleton information of the partner avatar by the virtual object control unit 157 has been described above. The virtual object control unit 157 corrects the skeleton information of the partner avatar as described above and generates a control parameter. Note that the virtual object control unit 157 may determine a control parameter to be actually used for display from a control parameter before correcting the skeleton information of the partner avatar (hereinafter, also referred to as a control parameter before corrected) and a control parameter generated by correcting the skeleton information of the partner avatar (hereinafter, referred to as a control parameter after corrected).

For example, the determination unit 155 may make a further determination on the basis of the control parameter after corrected, and the virtual object control unit 157 may determine a control parameter to be actually used for display on the basis of the further determination. Note that the further determination based on the control parameter after corrected may be a determination as to whether or not contact between the self-avatar and the partner avatar is expected, as in the above-described determination on the control parameter before corrected. Furthermore, in a case where it is determined that contact between the self-avatar and the partner avatar is expected on the basis of the control parameter after corrected, the virtual object control unit 157 may determine the control parameter after corrected as a control parameter that is actually used for display. According to such a configuration, in a case where contact is not expected with the control parameter after corrected, the control parameter before corrected is used, and the sense of discomfort given to the user can be further reduced.

The display control unit 159 controls display on the display unit 17. For example, the display control unit 159 causes the display unit 17 to display the self-avatar and the partner avatar on the basis of the information on the visual field determined by the visual field control unit 153 and the control parameter generated by the virtual object control unit 157. Furthermore, the display control unit 159 may cause the display unit 17 to display the virtual space on the basis of the information on the visual field.

The display unit 17 performs display under the control of the display control unit 159. As illustrated in FIG. 1, the information processing device 10 may be a sealed HMD, and with such a configuration, the display unit 17 can provide a user with a high immersive feeling. Furthermore, as illustrated in FIG. 1, the display unit 17 may be arranged in front of the user's eyes, and may be able to present different images to both eyes of the user. With such a configuration, the user can visually recognize the virtual space and the avatar as described above in a three-dimensional manner. Note that, according to the present embodiment, the user of the display unit 17 is the user wearing the information processing device 10, and is the above-described self-user.

The storage unit 19 stores a program for the control unit 15 to execute each of the processes described above, and various data. For example, the storage unit 19 may store the physical information of the user, the physical information of the avatar, and the history of information received from the sensor device 20, the other information processing device 10, and the like via the communication unit 13. Note that the function of the storage unit 19 may be provided in an external device, and the information processing device 10 may receive information stored in a storage unit of the external device via, for example, the communication unit 13.

As described above, the configuration example of the information processing device 10 has been described with reference to FIG. 5, but FIG. 5 is an example, and the present technology is not limited to such an example. For example, a part of functions illustrated in FIG. 5 may be provided in other information processing device connected to the information processing device 10. Such an example will be described later as a modified example.

3. OPERATION

Figure 9:
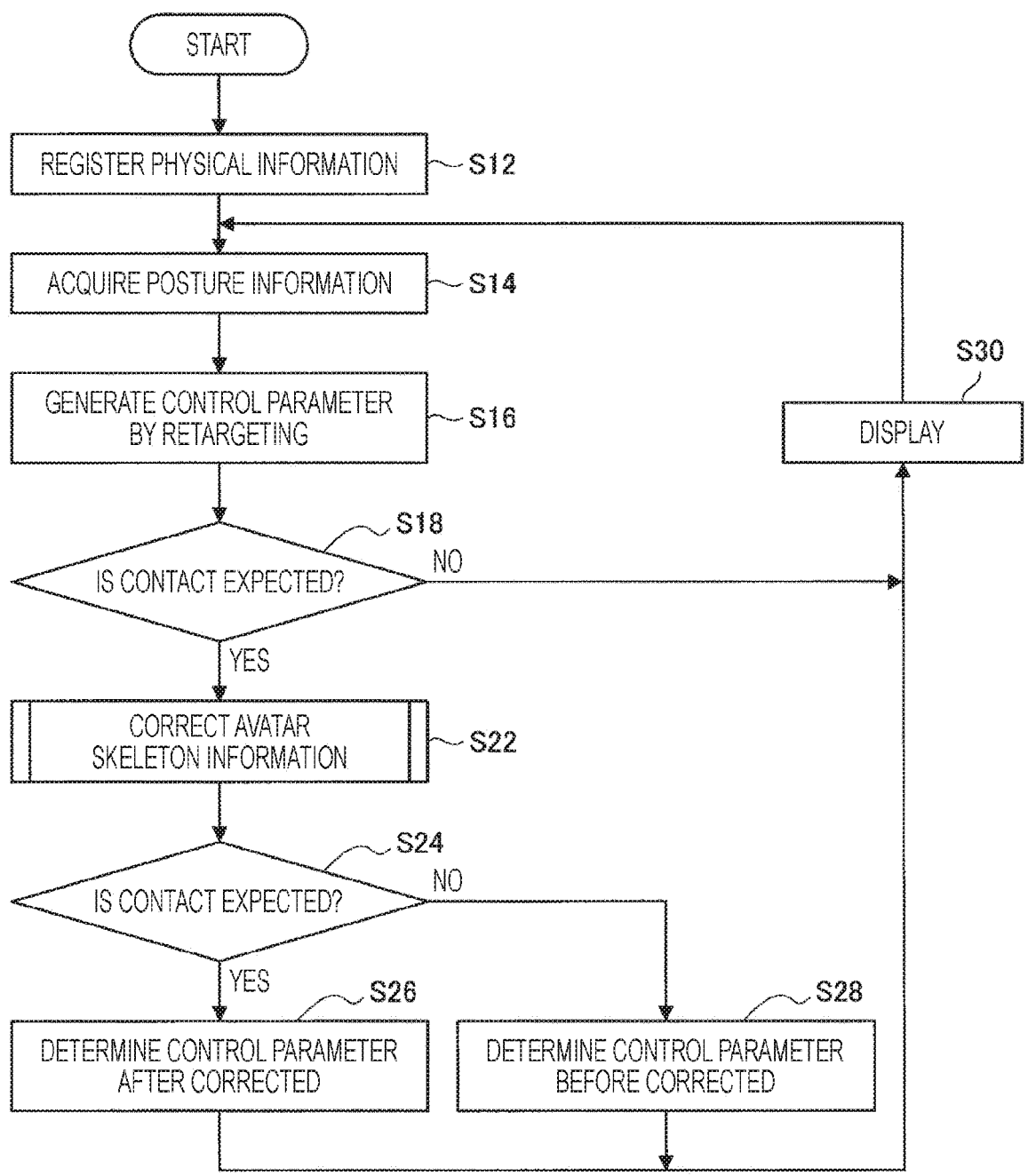
FIG. 9 is a flowchart illustrating an operation example of the information processing device 10 according to an embodiment.

The configuration example of the information processing device 10 according to the present embodiment has been described above. Subsequently, an operation example of the information processing device 10 according to the present embodiment will be described with reference to FIG. 9. FIG. 9 is a flowchart illustrating an operation example of the information processing device 10 according to the present embodiment.

As illustrated in FIG. 9, first, the physical information of each user and the physical information of each avatar are registered and stored in the storage unit 19 (S12). The user's physical information may be obtained by, for example, body measurement, 3D scanning, motion capture, and the like. Furthermore, the physical information of each avatar is generated by creating each avatar using, for example, computer graphics (CG) creation software and the like. Note that, in a case where the physical information of each user and the physical information of each avatar are registered, the above-described root part and contact part may be set and, furthermore, the user reachable distance and the avatar reachable distance may be calculated on the basis of the root part and the contact part.

Subsequently, posture information of each user is obtained (S14). For example, the skeleton information of the self-user (an example of the posture information of the self-user) may be estimated and obtained by the posture estimation unit 151 on the basis of the sensor information obtained by the sensing of the sensor device 20 or the sensor unit 11. Furthermore, the communication unit 13 may acquire the skeleton information of the partner user (an example of the posture information of the partner user) from the other information processing device 10.

Subsequently, the virtual object control unit 157 generates skeleton information of the self-avatar and skeleton information of the partner avatar by retargeting on the basis of each piece of the skeleton information of the self-user and the skeleton information of the partner user obtained in step S14, and generates a control parameter (S16).

Subsequently, the determination unit 155 determines whether or not contact between the self-avatar and the partner avatar is expected on the basis of the control parameter generated in step S16 (S18). In a case where it is determined that contact between the self-avatar and the partner avatar is not expected (NO in S18), each avatar is displayed using the control parameter generated in step S16 (S30), and the process returns to step S14.

Figure 10:
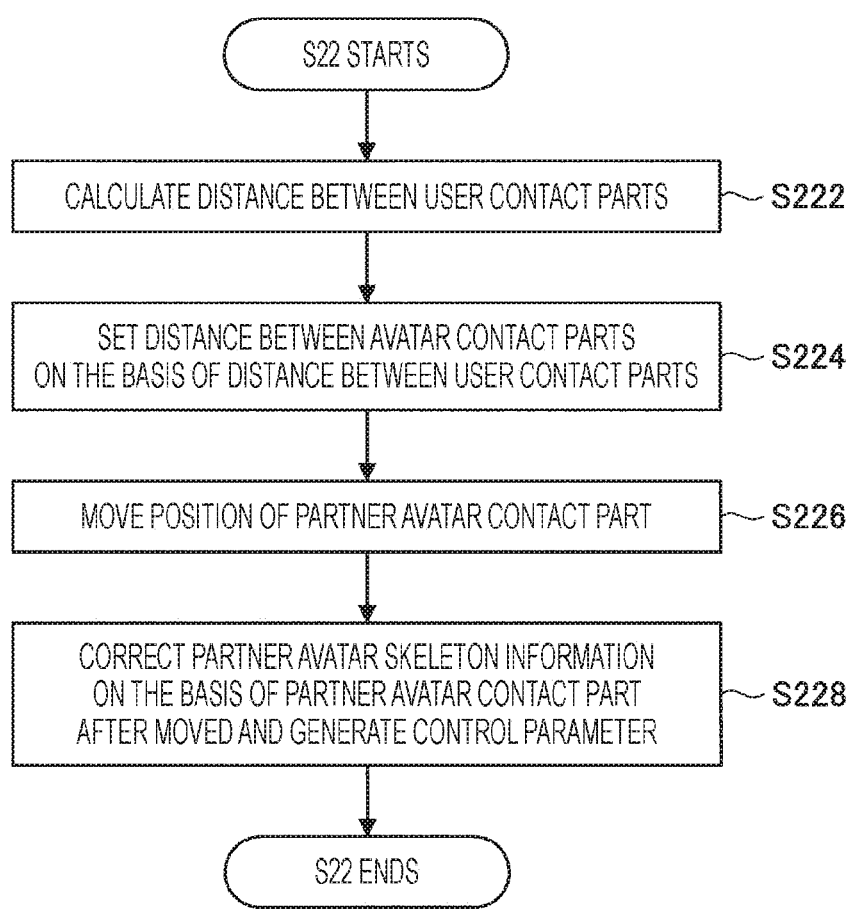
FIG. 10 is a flowchart for explaining a process in step S22 in detail.

On the other hand, in a case where it is determined that contact between the self-avatar and the partner avatar is expected (YES in S18), the skeleton information of the partner avatar is corrected by the virtual object control unit 157 (S22). Here, the processing in step S22 will be described in more detail with reference to FIG. 10. FIG. 10 is a flowchart for explaining the processing in step S22 in detail.

First, the virtual object control unit 157 calculates the distance between the user contact parts (first distance) (S222). Subsequently, the virtual object control unit 157 sets a distance between avatar contact parts (second distance) on the basis of the distance between the user contact parts (S224).

Subsequently, the virtual object control unit 157 moves the position of the contact part of the partner avatar on the basis of the distance between the avatar contact parts (S226). Then, the virtual object control unit 157 corrects the skeleton information of the partner avatar on the basis of the position of the contact part of the partner avatar after the movement, and generates a control parameter (S228). The processing in step S22 has been described above. Returning to FIG. 9, the description will be continued.

In the following step S24, the determination unit 155 makes a further determination as to whether or not contact between the self-avatar and the partner avatar is expected on the basis of the control parameter after corrected, which is generated in step S22 (S24).

Here, in a case where it is determined that contact between the self-avatar and the partner avatar is expected (YES in step S24), the virtual object control unit 157 determines the control parameter after corrected, which is generated in step S22, as a control parameter to be actually used for display (S26). Then, display is performed using the control parameter after corrected (S30), and the process returns to step S14.

On the other hand, in a case where it is determined that the contact between the self-avatar and the partner avatar is not expected (NO in step S24), the virtual object control unit 157 determines the control parameter before corrected, which is generated in step S16, as a control parameter to be actually used for display (S28). Then, display is performed using the control parameter before corrected (S30), and the process returns to step S14.

4. MODIFICATION

The embodiment of the present disclosure has been described above. In the following, some modifications of the embodiment are explained. Note that each of the modifications described below may be applied to the present embodiment independently, or may be applied to the present embodiment in combination. Furthermore, each modification may be applied as a substitute for the configuration described in the present embodiment, or may be additionally applied to the configuration described in the present embodiment.

4-1. First Modification

In the above-described embodiment, an example has been described in which the virtual object control unit 157 corrects the skeleton information of the partner avatar without correcting the skeleton information of the self-avatar. However, the present technology is not limited to such an example, and the virtual object control unit 157 may correct the skeleton information of the self-avatar.

As described above, in a case where the skeleton information of the self-avatar is corrected, a mismatch may occur between the physical sensation of the self-user and the display of the self-avatar. On the other hand, in a case where only the skeleton information of the partner avatar is corrected without correcting the skeleton information of the self-avatar, it is sometimes difficult to control to make contact between users and contact between avatars occur substantially simultaneously.

Therefore, the virtual object control unit 157 may correct the skeleton information of the self-avatar and generate the control parameter in a case where it is determined that it is impossible to correct the skeleton information of the partner avatar so as to satisfy a predetermined condition. Note that such determination may be made by, for example, the virtual object control unit 157, but is not limited to this example.

Figure 11:
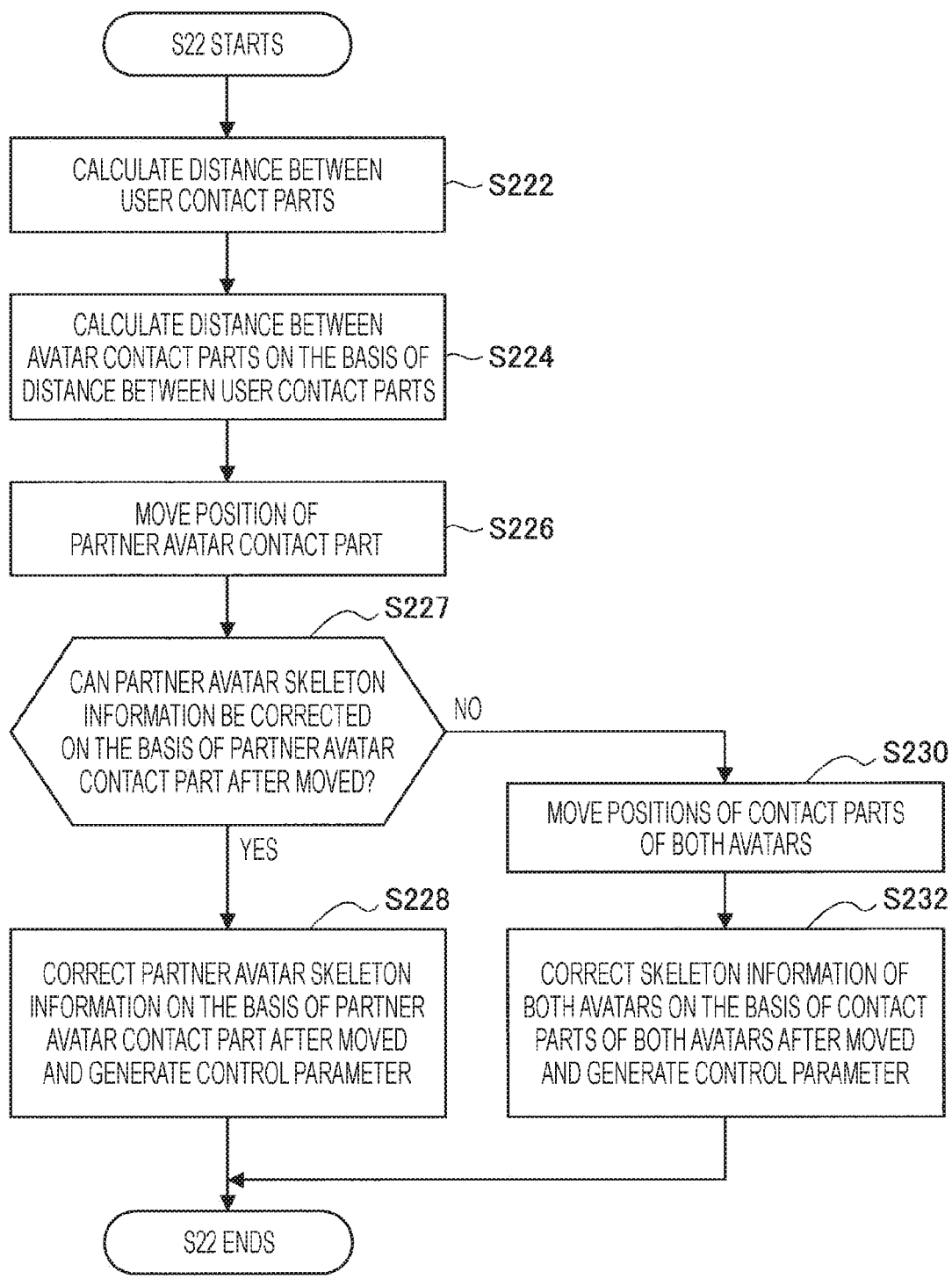
FIG. 11 is a flowchart for explaining in detail the process in step S22 in a modification of the embodiment.

For example, the predetermined condition may be a constraint condition including information on the position of the contact part of the partner avatar after moving on the basis of the second distance set without changing the third distance so that the skeleton information of the self-avatar does not have to be corrected. An example of the correction process (the process of step S22 illustrated in FIG. 9) in the above case will be described as a modification with reference to FIG. 11. FIG. 11 is a flowchart for explaining the process of step S22 in the present modification in detail.

First, the virtual object control unit 157 calculates the distance between the user contact parts (first distance) (S222). Subsequently, the virtual object control unit 157 sets a distance between avatar contact parts (second distance) on the basis of the distance between the user contact parts (S224).

Subsequently, the virtual object control unit 157 moves the position of the contact part of the partner avatar on the basis of the distance between the avatar contact parts (S226). Note that, in step S226, as described above, the position of the contact part of the partner avatar after the movement is specified so that the third distance, which is the distance between the contact part of the self-user and the contact part of the self-avatar, does not change.

Then, it is determined whether or not the skeleton information of the partner avatar can be corrected so as to satisfy the constraint condition including the information on the position of the contact part of the partner avatar after the movement in step S226 (S227).

Here, in a case where it is determined that the skeleton information of the partner avatar can be corrected (YES in S227), the virtual object control unit 157 corrects the skeleton information of the partner avatar on the basis of the position of the contact part of the partner avatar after the movement and generates a control parameter (S228).

On the other hand, here, in a case where it is determined that the skeleton information of the partner avatar can be corrected (NO in S227), the virtual object control unit 157 moves the positions of the contact parts of the both avatars of the self-avatar and the partner avatar (S230). For example, the virtual object control unit 157 moves the position of the contact parts of the avatars of both the self-avatar and the partner avatar on the basis of the distance between the avatar contact parts set in step S224 and by changing the third distance.

Then, the virtual object control unit 157 corrects the skeleton information of the partner avatar and the skeleton information of the self-avatar on the basis of the position of the contact part of the partner avatar after the movement and the position of the contact part of the self-avatar and generate a control parameter (S232).

As described above, the virtual object control unit 157 may correct not only the skeleton information of the partner avatar but also the skeleton information of the self-avatar. According to such a configuration, for example, it is possible to control so that the contact between the users and the contact between the avatars occur almost simultaneously by correcting the skeleton information of the self-avatar even in a case where it is difficult to control so that the contact between the users and the contact between the avatars occur almost simultaneously only by correcting the skeleton information of the partner avatar.

4-2. Second Modification

In the above-described embodiment, an example has been described in which the determination unit 155 performs the determination regarding the contact between the avatars on the basis of the skeleton information of each user and the skeleton information of each avatar; however, the present technology is not limited to the example. For example, the determination unit 155 may perform determination regarding the contact between the avatars on the further basis of shape information of the self-user, shape information of the partner user, shape information of the self-avatar, and shape information of the partner avatar, in addition to the information described above.

For example, by performing the determination on the basis of shape information, the determination can be performed with higher accuracy in a case where the shape is largely different between the self-user and the self-avatar, or in a case where the shape is significantly different between the partner user and the partner avatar.

Furthermore, in a similar manner, the virtual object control unit 157 may generate a control parameter on the basis of the shape information of the self-user, the shape information of the partner user, the shape information of the self-avatar, and the shape information of the partner avatar, and this configuration can further reduce discomfort given to the user.

Note that all of the shape information of the self-user, the shape information of the partner user, the shape information of the self-avatar, and the shape information of the partner avatar may not have to be used for the determination and the generation of the control parameter. For example, the shape information of the partner user and the shape information of the partner avatar may be used, and the shape information of the self-user and the shape information of the self-avatar may not be used.

4-3. Third Modification

According to the above embodiment, an example has been described in which the control parameter generated by the virtual object control unit 157 includes the skeleton information of the self-avatar and the skeleton information of the partner avatar; however, the present technology is not limited to the example. For example, the control parameter generated by the virtual object control unit 157 may include an expression parameter related to an expression method of the self-avatar and the partner avatar.

For example, a control parameter may be generated to include an expression parameter so that the virtual object control unit 157 blurs the CG of the vicinity of the contact part of the self-avatar and the partner avatar in a case where the distance between the avatar contact parts (the second distance) is smaller than a predetermined value. According to this configuration, since it becomes more difficult to recognize the timing of the contact, and discomfort given to the user is further reduced.

Furthermore, the virtual object control unit 157 may generate the expression parameter on the further basis of whether or not the self-avatar and the partner avatar are in contact with each other. Note that the determination as to whether or not the self-avatar and the partner avatar are in contact may be performed by, for example, the determination unit 155.

For example, the virtual object control unit 157 may generate the expression parameter so that the CG immersion is reduced in a case where it is determined that the self-avatar and the partner avatar are in contact. For example, in a case where it is determined that the self-avatar and the partner avatar are in contact with each other, the virtual object control unit 157 may generate an expression parameter that resizes only the CG in the vicinity of the contact part between the self-avatar and the partner avatar, or an expression parameter that thickens the outline of the CG in the vicinity. With such a configuration, discomfort given to the user in a case where the self-avatar and the partner avatar are in contact with each other is further reduced.

4-4. Fourth Modification

Furthermore, in the above embodiment, the case where two avatars corresponding to two users are displayed has been described as an example; however, the present technology is not limited to this example. More avatars corresponding to more users may be displayed. In such a case, the content of the processing itself is similar to the above-described example, but the processing amount increases due to the increase of the partner users and the partner avatars. Furthermore, in the above-described embodiment, the example in which the contact part of each user and the contact part of each avatar are set one by one is mainly described, but the contact part of each user and the contact part of each avatar may be set plurally. Then, the processing amount may be increased by the number of combinations of the contact parts between users and between avatars. Depending on the processing performance of the information processing device 10, it may be difficult to handle the increase in the processing amount. Furthermore, depending on the processing performance of the information processing device 10, even in a case where the processing is limited to two users and the like, it may be difficult to perform the processing at a sufficient speed.

Figure 12:
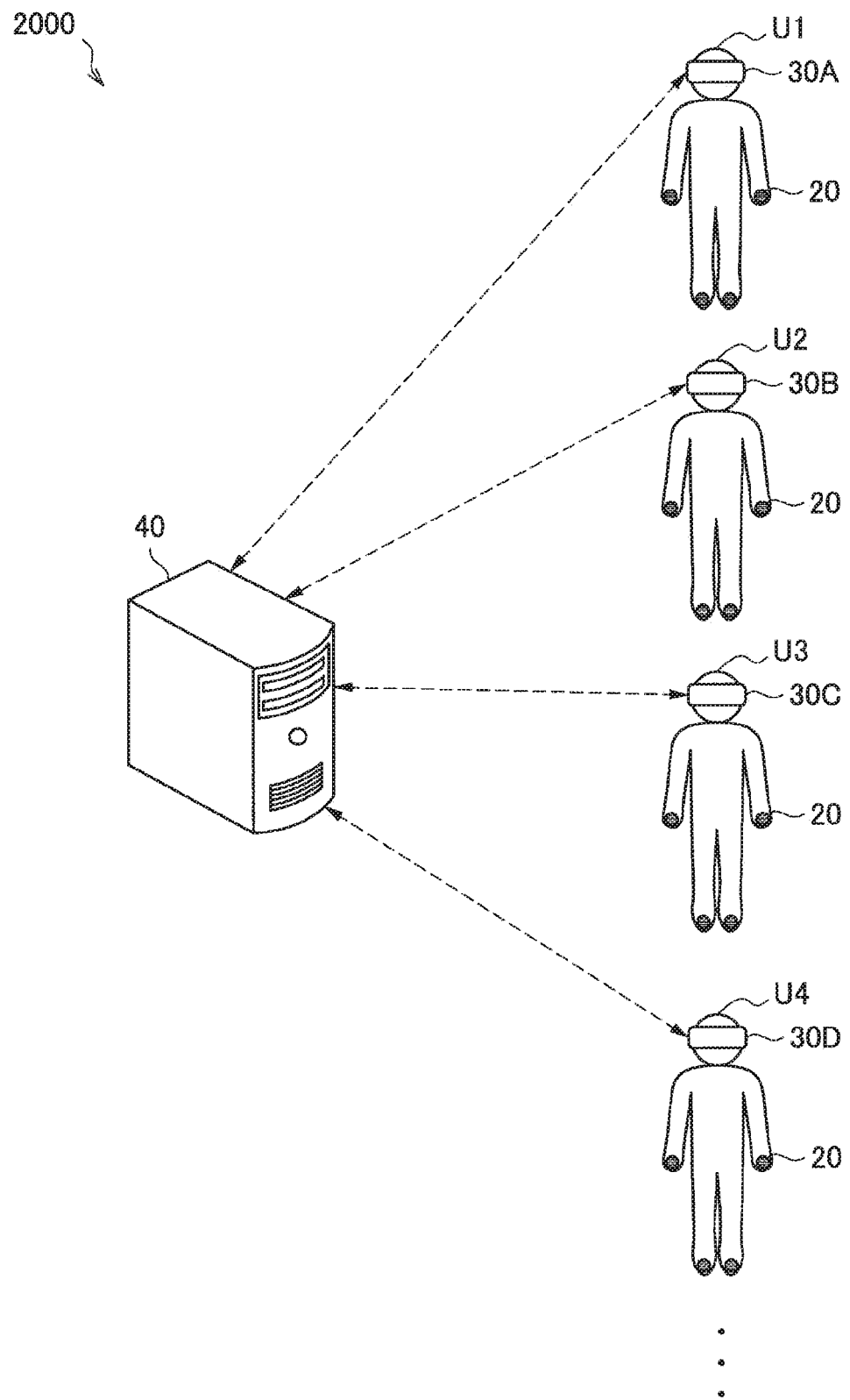
FIG. 12 is a diagram for explaining a schematic configuration of an information processing system 2000 according to a modification of the embodiment.

Therefore, for example, some or all of the above-described distances of the control unit 15 can be performed by the other information processing device having higher processing performance. The modified example will be described with reference to FIG. 12. FIG. 12 is a diagram for explaining a schematic configuration of an information processing system 2000 according to the present modification.

The information processing system 2000 illustrated in FIG. 12 includes a plurality of sensor devices 20, information processing devices 30A, 30B, 30C, 30D, etc., and a server 40. The sensor device 20 illustrated in FIG. 12 is similar to the sensor device 20 described with reference to FIG. 1, and a detailed description thereof will be omitted.

The information processing devices 30A, 30B, 30C, 30D, etc. illustrated in FIG. 12 are display devices such as HMDs worn by users U1, U2, U3, U4, etc. The information processing devices 30A, 30B, 30C, 30D, etc. and the server 40 are connected directly or via a network access point and the like, and can transmit and receive data. Note that, in the following, the information processing devices 30A, 30B, 30C, 30D, etc. may be collectively referred to as the information processing device 30 in a case where it is not necessary to distinguish between them. Furthermore, FIG. 12 illustrates only four information processing devices 30A, 30B, 30C, and 30D, but the information processing system 2000 may include a greater or lesser number of information processing devices 30.

The information processing device 30 may have, for example, functions as the posture estimation unit 151, the visual field control unit 153, and the display control unit 159 among the functions of the control unit 15 illustrated in FIG. 5. Furthermore, other configurations of the information processing device 30 may be similar to those of the information processing device 10 illustrated in FIG. 5.

The server 40 may be an information processing device having higher processing performance than the information processing device 30. For example, the server 40 may have functions as the determination unit 155 and the virtual object control unit 157 among the functions of the control unit 15 illustrated in FIG. 5. Then, the server 40 may receive the posture information from each of the information processing devices 30 illustrated in FIG. 12, generate a control parameter for each information processing device 30 on the basis of the posture information, and transmit the generated control parameter to each information processing device 30.

According to this configuration, even in a case where the processing performance of the information processing device 30 is low, the server 40 performs the processing related to the determination or the generation of the control parameter, thereby realizing the processing at a sufficient speed.

<4-5. Fifth Modification>

Furthermore, in the above embodiment, an avatar corresponding to a user has been described as an example of a virtual object, but the present technology is not limited to the example. The virtual object according to the embodiment of the present technology may be a virtual object corresponding to a real object other than the user, for example, a virtual object corresponding to a real object held by the user.

For example, on the basis of posture information of a real object (first real object) held by a self-user and posture information of a partner user (second real object), the control parameter for controlling display of a virtual object (first virtual object) corresponding to the real object and a partner avatar (second virtual object) corresponding to the partner user may be generated. According to this configuration, for example, in a case where the self-user tries to pass the real object to the partner user, the self-user can hand the real object to the partner user as seeing the distance between the virtual object corresponding to the real object and the partner avatar without feeling discomfort. Note that, also in this case, it is preferable that the skeleton information of the partner avatar be corrected with higher priority than the skeleton information of the virtual object corresponding to the real object held by the self-user in order to reduce the discomfort of the self-user.

<4-6. Sixth Modification>

Furthermore, according to the above-described embodiment, as an example of the motion capture technology, an example in which the posture information of the user is acquired from the sensor device including the IMU worn by the user has been described; however, the present technology is not limited to the example and various motion capture technologies may be used. A motion capture technology using a marker and a camera may be used, or a motion capture technology that estimates a posture on the basis of an image captured by a camera may be used without an IMU or a marker.

5. HARDWARE CONFIGURATION EXAMPLE

Figure 13:
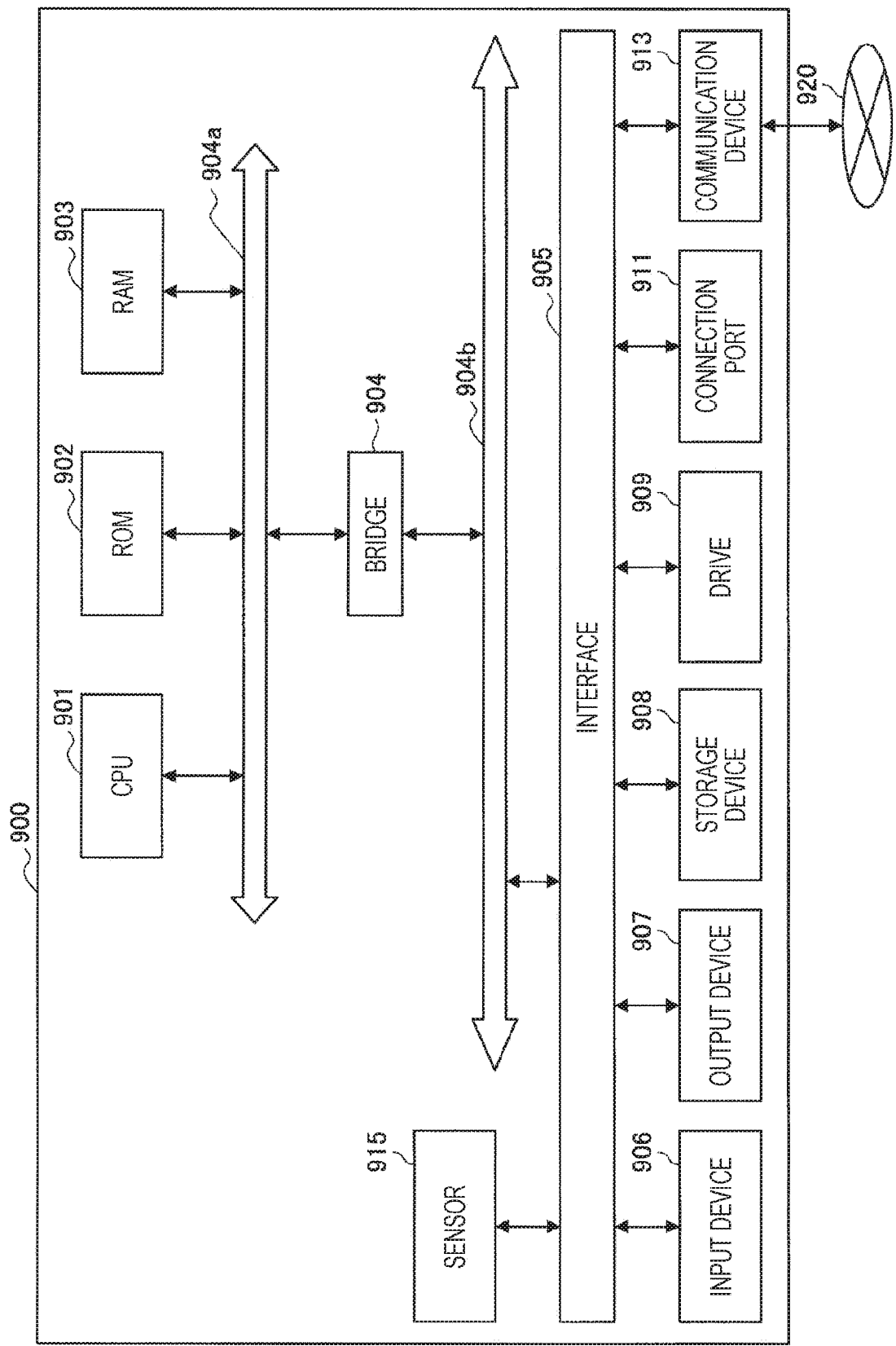
FIG. 13 is a block diagram illustrating an example of a hardware configuration.

The embodiment of the present disclosure has been described above. Lastly, a hardware configuration of the information processing device according to the embodiment of the present disclosure will be described with reference to FIG. 13. FIG. 13 is a block diagram illustrating an example of a hardware configuration of the information processing device according to the embodiment of the present disclosure. Note that the information processing device 900 illustrated in FIG. 13 can realize the information processing device 10, the information processing device 30, and the server 40 described above, for example. Information processing by the information processing device 10, the information processing device 30, and the server 40 according to the embodiment of the present disclosure is realized by cooperation of software and hardware described below.

As illustrated in FIG. 13, the information processing device 900 includes a central processing unit (CPU) 901, a read only memory (ROM) 902, a random access memory (RAM) 903, and a host bus 904a. Furthermore, the information processing device 900 includes a bridge 904, an external bus 904b, an interface 905, an input device 906, an output device 907, a storage device 908, a drive 909, a connection port 911, a communication device 913, and a sensor 915. The information processing device 900 may include a processing circuit such as a DSP or an ASIC in place of or in addition to the CPU 901.

The CPU 901 functions as an arithmetic processing device and a control device, and controls the overall operation within the information processing device 900 according to various programs. Furthermore, the CPU 901 may be a microprocessor. The ROM 902 stores programs used by the CPU 901 and calculation parameters and the like. The RAM 903 temporarily stores programs used in the execution of the CPU 901, parameters that vary as appropriate during the execution, and the like. The CPU 901 may form the control unit 15, for example.

The CPU 901, the ROM 902, and the RAM 903 are connected to each other by the host bus 904a including a CPU bus and the like. The host bus 904a is connected to the external bus 904b such as a peripheral component interconnect/interface (PCI) bus via the bridge 904. Note that the host bus 904a, the bridge 904, and the external bus 904b are not necessarily configured separately, and these functions may be mounted on a single bus.

The input device 906 is realized, for example, by a device to which information is input by the user, such as a mouse, a keyboard, a touch panel, a button, a microphone, a switch, or a lever. Furthermore, the input device 906 may be, for example, a remote control device that uses infrared rays or other radio waves, or may be an external connected device such as a mobile phone or a PDA compatible with the operation of the information processing device 900. Furthermore, the input device 906 may include, for example, an input control circuit and the like that generates an input signal on the basis of information input by the user using the above input means and outputs the input signal to the CPU 901. A user of the information processing device 900 can input various data to the information processing device 900 and instruct the information processing device 900 on a processing operation by operating the input device 906.

The output device 907 includes a device capable of visually or audibly notifying the user of acquired information. As such a device, there are a CRT display device, a liquid crystal display device, a plasma display device, an EL display device, a display device such as a lamp, an audio output device such as a speaker and headphones, a printer device, and the like. The output device 907 outputs results obtained by various processes performed by the information processing device 900, for example. Specifically, the display device visually displays the results obtained by various processes performed by the information processing device 900 in various formats such as text, images, tables, and graphs. On the other hand, the audio output device converts an audio signal including reproduced audio data, acoustic data, and the like into an analog signal and outputs the signal aurally. The output device 907 may form the display unit 17, for example.

The storage device 908 is a data storage device formed as an example of a storage unit of the information processing device 900. The storage device 908 is realized by, for example, a magnetic storage device such as an HDD, a semiconductor storage device, an optical storage device, a magneto-optical storage device, or the like. The storage device 908 may include a storage medium, a recording device that records data on the storage medium, a reading device that reads data from the storage medium, a deletion device that deletes data recorded on the storage medium, and the like. The storage device 908 stores programs executed by the CPU 901, various data, various data acquired from the outside, and the like. The above storage device 908 may form the storage unit 19, for example.

The drive 909 is a storage medium reader/writer, and is built in or externally attached to the information processing device 900. The drive 909 reads information recorded on a removable storage medium such as a mounted magnetic disk, optical disk, magneto-optical disk, or semiconductor memory, and outputs the information to the RAM 903. Furthermore, the drive 909 can also write information on a removable storage medium.

The connection port 911 is an interface connected to an external device, and is a connection opening to an external device capable of transmitting data by a universal serial bus (USB) and the like, for example.

The communication device 913 is a communication interface formed by a communicating device and the like for connecting to the network 920, for example. The communication device 913 is, for example, a communication card for wired or wireless local area network (LAN), Long Term Evolution (LTE), Bluetooth (registered trademark), Wireless USB (WUSB), and the like. Furthermore, the communication device 913 may be an optical communication router, an asymmetric digital subscriber line (ADSL) router, various communication modems, and the like. The communication device 913 can transmit and receive signals and the like according to a predetermined protocol such as TCP/IP, for example, with the Internet and other communication devices, for example. The communication device 913 may form the communication unit 13, for example.

The sensor 915 is various sensors such as an acceleration sensor, a gyro sensor, a geomagnetic sensor, an optical sensor, a sound sensor, a distance measuring sensor, and a force sensor, for example. The sensor 915 acquires information regarding the state of the information processing device 900 itself, such as the posture and movement speed of the information processing device 900, and information regarding the surrounding environment of the information processing device 900, such as brightness and noise around the information processing device 900. Furthermore, the sensor 915 may also include a GPS sensor that receives GPS signals and measures the latitude, longitude, and altitude of the device. The sensor 915 may form the sensor unit 11, for example.

Note that the network 920 is a wired or wireless transmission path for information transmitted from a device connected to the network 920. For example, the network 920 may include a public line network such as the Internet, a telephone line network, a satellite communication network, various local area networks (LANs) including Ethernet (registered trademark), a wide area network (WAN), and the like. Furthermore, the network 920 may include a dedicated line network such as Internet protocol-virtual private network (IP-VPN).

Heretofore, an example of a hardware configuration capable of realizing the functions of the information processing device 900 according to the embodiment of the present disclosure has been described. Each of the above components may be realized using a general-purpose member, or may be realized by hardware specialized for the function of each component. Therefore, it is possible to appropriately change the hardware configuration to be used according to the technical level at the time of implementing the embodiments of the present disclosure.

Note that a computer program for realizing each function of the information processing device 900 according to the embodiment of the present disclosure as described above can be produced and mounted on a PC and the like. Furthermore, a computer-readable recording medium storing such a computer program can be provided. The recording medium is, for example, a magnetic disk, an optical disk, a magneto-optical disk, a flash memory, and the like. Furthermore, the above computer program may be distributed via a network, for example, without using a recording medium.

6. CONCLUSION

As described above, according to the embodiment of the present disclosure, it is possible to further reduce the sense of discomfort given to the user.

Although the preferred embodiments of the present disclosure have been described in detail with reference to the accompanying drawings, the technical scope of the present disclosure is not limited to such examples. It is obvious that persons having ordinary knowledge in the technical field of the present disclosure can conceive various changes or modifications within the scope of the technical idea described in the claims and it is naturally understood that those changes and modifications belong to the technical scope of the present disclosure.

For example, each step in the above-described embodiment does not necessarily need to be processed chronologically in the order described in the flowchart. For example, each step in the processing of the above embodiment may be processed in an order different from the order described in the flowchart, or may be processed in parallel.

In addition, the effects described in the present specification are merely illustrative or exemplary and do not set any limitation. In other words, the technique according to the present disclosure can provide other effects obvious to those skilled in the art from the description of the present specification together with the above described effects or in addition to the above effects.

Note that the following configurations are also within the technical scope of the present disclosure.

(1)

An information processing device including:

a virtual object control unit configured to generate a control parameter that controls display of a first virtual object corresponding to a first real object and a second virtual object corresponding to a second real object on the basis of first posture information indicating a posture of the first real object and second posture information indicating a posture of the second real object; and a determination unit configured to make a determination related to contact between the first virtual object and the second virtual object, in which the virtual object control unit generates the control parameter on the further basis of a result of the determination.

(2)

The information processing device according to the above (1), in which the determination unit makes the determination on the basis of the first posture information, the second posture information, and the control parameter.

(3)

The information processing device according to the above (2), in which the first posture information is acquired on the basis of sensing related to the first real object and includes first real skeleton information indicating the posture of the first real object, the second posture information is acquired on the basis of sensing related to the second real object and includes second real skeleton information indicating the posture of the second real object, and the control parameter includes first virtual skeleton information indicating a posture of the first virtual object, and second virtual skeleton information indicating a posture of the second virtual object.

(4)

The information processing device according to the above (3), in which the determination unit determines whether or not contact between the first virtual object and the second virtual object is expected.

(5)

The information processing device according to the above (4), in which in a case where it is determined that contact between the first virtual object and the second virtual object is expected, the virtual object control unit corrects at least one of the first virtual skeleton information or the second virtual skeleton information and generates the control parameter.

(6)

The information processing device according to the above (5), in which the virtual object control unit sets a second distance related to the first virtual skeleton information and the second virtual skeleton information on the basis of a first distance specified on the basis of the first real skeleton information and the second real skeleton information and performs the correction on the basis of the second distance.

(7)

The information processing device according to the above (6), in which the virtual object control unit sets the second distance so that the second distance becomes zero in a case where the first distance becomes zero.

(8)

The information processing device according to the above (6) or (7), in which the virtual object control unit sets the second distance so that the second distance becomes closer to zero as the first distance becomes closer to zero.

(9)

The information processing device according to any one of the above (5) to (8), in which the first real object is a user of a display unit that displays the first virtual object and the second virtual object, or a real object held by the user, and the virtual object control unit corrects the second virtual skeleton information without correcting the first virtual skeleton information and generates the control parameter.

(10)

The information processing device according to any one of the above (5) to (8), in which the first real object is a user of a display unit that displays the first virtual object and the second virtual object, or a real object held by the user, and in a case where it is determined that the second virtual skeleton information cannot be corrected to satisfy a predetermined condition, the virtual object control unit corrects the first virtual skeleton information and generates the control parameter.

(11)

The information processing device according to any one of the above (5) to (10), in which the determination unit makes a further determination related to contact between the first virtual object and the second virtual object on the basis of the control parameter generated by the correction, and the virtual object control unit determines the control parameter to be used for the display of the first virtual object and the second virtual object on the basis of a result of the further determination.

(12)

The information processing device according to any one of the above (2) to (11), in which the determination unit makes the determination on the further basis of information related to a display range.

(13)

The information processing device according to any one of the above (2) to (12), in which the determination unit makes the determination on the further basis of at least one of shape information of the first real object, shape information of the second real object, shape information of the first virtual object, or shape information of the second virtual object.

(14)

The information processing device according to any one of the above (1) to (13), in which the control parameter includes an expression parameter related to an expression method of the first virtual object and the second virtual object.

(15)

The information processing device according to the above (14), in which the virtual object control unit generates the control parameter on the further basis of whether or not the first virtual object and the second virtual object are in contact.

(16)

An information processing method, including:

generating a control parameter that controls display of a first virtual object corresponding to a first real object and a second virtual object corresponding to a second real object on the basis of first posture information indicating a posture of the first real object and second posture information indicating a posture of the second real object;

making a determination related to contact between the first virtual object and the second virtual object; and generating the control parameter on the basis of a result of the determination.

(17)

A program that causes a computer to realize functions including:

a function of generating a control parameter that controls display of a first virtual object corresponding to a first real object and a second virtual object corresponding to a second real object on the basis of first posture information indicating a posture of the first real object and second posture information indicating a posture of the second real object;

making a determination related to contact between the first virtual object and the second virtual object; and a function for the control parameter on the further basis of a result of the determination.

REFERENCE SIGNS LIST

10 Information processing device
11 Sensor unit
13 Communication unit
15 Control unit
151 Posture estimation unit
153 Visual field control unit
155 Determination unit
157 Virtual object control unit
159 Display control unit
17 Display unit
19 Storage unit
20 Sensor device
1000 Information processing system

The invention claimed is:

1. An information processing device, comprising:
a central processing unit (CPU) configured to:
generate a control parameter that controls display of a first virtual object and a second virtual object based on first posture information and second posture information, wherein
the first virtual object corresponds to a first real object,
the second virtual object corresponds to a second real object,
the first posture information is acquired based on a sensing associated with the first real object,
the first posture information includes first real skeleton information that indicates a posture of the first real object,
the second posture information is acquired based on a sensing associated with the second real object,
the second posture information includes second real skeleton information that indicates a posture of the second real object, and
the control parameter includes first virtual skeleton information that indicates a posture of the first virtual object, and second virtual skeleton information that indicates a posture of the second virtual object;
determine a contact between the first virtual object and the second virtual object; and
generate the control parameter further based on a result of the determination.

2. The information processing device according to claim 1, wherein the CPU is further configured to determine the contact based on the first posture information, the second posture information, and the control parameter.

3. The information processing device according to claim 1, wherein the CPU is further configured to determine a possibility of the contact between the first virtual object and the second virtual object.

4. The information processing device according to claim 3, wherein based on the possibility of the contact between the first virtual object and the second virtual object, the CPU is further configured to:
correct at least one of the first virtual skeleton information or the second virtual skeleton information; and
generate the control parameter.

5. The information processing device according to claim 4, wherein the CPU is further configured to:
set a second distance based on a first distance, wherein
the second distance is associated with the first virtual skeleton information and the second virtual skeleton information, and
the first distance is based on the first real skeleton information and the second real skeleton information; and
perform the correction based on the second distance.

6. The information processing device according to claim 5, wherein the CPU is further configured to set the second distance so that the second distance becomes zero in a case the first distance becomes zero.

7. The information processing device according to claim 5, wherein the CPU is further configured to set the second distance so that the second distance becomes closer to zero as the first distance becomes closer to zero.

8. The information processing device according to claim 4, wherein
the first real object is a user of a display device that displays the first virtual object and the second virtual object, or a real object held by the user, and
the CPU is further configured to:
correct the second virtual skeleton information without correcting the first virtual skeleton information; and
generate the control parameter.

9. The information processing device according to claim 4, wherein
the first real object is a user of a display device that displays the first virtual object and the second virtual object, or a real object held by the user, and
based on the second virtual skeleton information that cannot be corrected to satisfy a specific condition, the CPU is further configured to:
correct the first virtual skeleton information; and
generate the control parameter.

10. The information processing device according to claim 4, wherein
the CPU is further configured to:
determine the contact between the first virtual object and the second virtual object based on the control parameter generated by the correction; and
determine the control parameter to be used for display of the first virtual object and the second virtual object, wherein the control parameter is determined based on a result of the determination based on the control parameter generated by the correction.

11. The information processing device according to claim 2, wherein the CPU is further configured to determine the contact based on information associated with a display range of a display device.

12. The information processing device according to claim 2, wherein the CPU is further configured to determine the contact based on at least one of shape information of the first real object, shape information of the second real object, shape information of the first virtual object, or shape information of the second virtual object.

13. The information processing device according to claim 1, wherein the control parameter includes an expression parameter associated with an expression method of the first virtual object and the second virtual object.

14. The information processing device according to claim 13, wherein the CPU is further configured to generate the control parameter based on the contact between the first virtual object and the second virtual object.

15. An information processing method, comprising:
in an information processing device:
generating a control parameter that controls display of a first virtual object and a second virtual object based on first posture information and second posture information, wherein
the first virtual object corresponds to a first real object,
the second virtual object corresponds to a second real object,
the first posture information is acquired based on a sensing associated with the first real object,
the first posture information includes first real skeleton information that indicates a posture of the first real object,
the second posture information is acquired based on a sensing associated with the second real object,
the second posture information includes second real skeleton information that indicates a posture of the second real object, and
the control parameter includes first virtual skeleton information that indicates a posture of the first virtual object, and second virtual skeleton information that indicates a posture of the second virtual object;
determining a contact between the first virtual object and the second virtual object; and
generating the control parameter based on a result of the determination.

16. A non-transitory computer-readable medium having stored thereon, computer-executable instructions which, when executed by a computer, causes the computer to execute operations, the operations comprising:
generating a control parameter that controls display of a first virtual object and a second virtual object based on first posture information and second posture information, wherein
the first virtual object corresponds to a first real object,
the second virtual object corresponds to a second real object,
the first posture information is acquired based on a sensing associated with the first real object,
the first posture information includes first real skeleton information that indicates a posture of the first real object,
the second posture information is acquired based on a sensing associated with the second real object,
the second posture information includes second real skeleton information that indicates a posture of the second real object, and
the control parameter includes first virtual skeleton information that indicates a posture of the first virtual object, and second virtual skeleton information that indicates a posture of the second virtual object;
determining a contact between the first virtual object and the second virtual object; and
generating the control parameter based on a result of the determination.

* * * * *